United States Patent
Kakinuma et al.

(10) Patent No.: US 10,126,561 B2
(45) Date of Patent: Nov. 13, 2018

(54) DECORATIVE PLASTIC MOLDED ARTICLE AND MANUFACTURING METHOD THEREOF

(71) Applicant: SEIKOH GIKEN CO., LTD., Matsudo-Shi, Chiba (JP)

(72) Inventors: Norihiro Kakinuma, Chiba (JP); Masahide Hioki, Chiba (JP)

(73) Assignee: SEIKOH GIKEN CO., LTD., Chiba (JP)

( * ) Notice: Subject to any disclaimer, the term of this patent is extended or adjusted under 35 U.S.C. 154(b) by 14 days.

(21) Appl. No.: 14/976,872

(22) Filed: Dec. 21, 2015

(65) Prior Publication Data

US 2016/0178916 A1      Jun. 23, 2016

(30) Foreign Application Priority Data

Dec. 22, 2014   (JP) ................. 2014-259382

(51) Int. Cl.
| | |
|---|---|
| *G02B 5/18* | (2006.01) |
| *G02B 27/14* | (2006.01) |
| *B29C 45/37* | (2006.01) |
| *G09F 13/18* | (2006.01) |
| *B65D 1/02* | (2006.01) |

(Continued)

(52) U.S. Cl.
CPC .......... *G02B 27/143* (2013.01); *B29C 45/372* (2013.01); *B65D 1/0207* (2013.01); *B65D 51/245* (2013.01); *G09F 13/18* (2013.01); *B29K 2995/0031* (2013.01); *B29L 2031/722* (2013.01); *B65D 2203/00* (2013.01); *G09F 2013/1863* (2013.01)

(58) Field of Classification Search
CPC ....... G02B 5/124; G02B 5/126; G02B 5/1842
USPC .......................... 359/529, 538, 567, 530, 10
See application file for complete search history.

(56) References Cited

U.S. PATENT DOCUMENTS 4,094,575 A * 6/1978 Kellie ................. G02B 5/1842
                                                        359/10
5,229,882 A * 7/1993 Rowland .......... B29D 11/00605
                                                        156/247

(Continued)

FOREIGN PATENT DOCUMENTS

| JP | 57-163523 A | 10/1982 |
|---|---|---|
| JP | 2002-5694 A | 1/2002 |

(Continued)

*Primary Examiner* — Audrey Y Chang
(74) *Attorney, Agent, or Firm* — Hauptman Ham, LLP

(57) ABSTRACT

A decorative plastic molded article has an outer appearance of metallic color like and a display of a character, a graph or a symbol. A body of the molded article has a plate-like portion; the plate-like portion has a first surface and a second surface; a small concave and convex portion is formed on the second surface; the small concave and convex portion has a plurality of inclined surfaces. The outer appearance of metallic color like is obtained by the total reflection light at the inclined surface and the display of a character, a graph or a symbol is obtained by the transmissive light through a planar transparent portion with shape of a character, a graph or a symbol formed in the small concave and convex portion or the total reflection light at the small concave and convex portion with shape of a character, a graph or a symbol.

19 Claims, 26 Drawing Sheets

(51) Int. Cl.
*B65D 51/24* (2006.01)
*B29L 31/00* (2006.01)

(56) References Cited

U.S. PATENT DOCUMENTS

| | | | | |
|---|---|---|---|---|
| 6,376,045 | B1 * | 4/2002 | Wong | C09J 7/0296 359/538 |
| 6,685,323 | B1 * | 2/2004 | Mimura | G02B 5/124 359/529 |
| 2002/0000515 | A1 | 1/2002 | Takayama et al. | |
| 2005/0260386 | A1 * | 11/2005 | Heinrich | B29C 45/14811 428/141 |

FOREIGN PATENT DOCUMENTS

| | | |
|---|---|---|
| JP | 2005-125648 A | 5/2005 |
| JP | 2005-125649 A | 5/2005 |
| JP | 4748470 B2 | 8/2011 |
| JP | 2014-177062 A | 9/2014 |

\* cited by examiner

FIG. 7

| TEST SAMPLE SERIAL NUMBER | RESIN | MOLD SHAPE (a TO d) | MOLD TEMPERATURE (°C) | RESIN TEMPERATURE (°C) | LIGHT TRANSMITTANCE (%) |
|---|---|---|---|---|---|
| 1 | PS | d | 60 | 210 | 95.3 |
| 2 | ↑ | b | ↑ | ↑ | 74.4 |
| 3 | ↑ | a | ↑ | ↑ | 67.6 |
| 4 | ↑ | a | ↑ | ↑ | 61.7 |
| 5 | ↑ | a | ↑ | 260 | 47.4 |
| 6 | ↑ | c | 75 | ↑ | 41.0 |
| 7 | ↑ | a | 80 | ↑ | 29.2 |
| 8 | ↑ | a | 85 | ↑ | 19.2 |
| 9 | ↑ | a | 90 | ↑ | 12.1 |

MOLD SHAPE a. THE WIDTH OF V-SHAPED SLOT: 60μm;
   THE DEPTH OF V-SHAPED SLOT: 30 μm;
   THE WIDTH OF THE LIGHT-TRANSMITTING PORTION: 0μm;

b. THE WIDTH OF V-SHAPED SLOT: 60μm;
   THE DEPTH OF V-SHAPED SLOT: 30μm;
   THE WIDTH OF THE LIGHT-TRANSMITTING PORTION: 10μm;

c. THE WIDTH OF V-SHAPED SLOT: 30μm;
   THE DEPTH OF V-SHAPED SLOT: 15μm;
   THE WIDTH OF THE LIGHT-TRANSMITTING PORTION: 10μm;

d. NO V-SHAPED SLOT (PLANAR)

FIG. 8

| TEST SAMPLE SERIAL NUMBER | LIGHT TRANSMITTANCE (%) | DEGREE OF THE METALLIC COLOR (○△×) |
|---|---|---|
| 1 | 95.3 | × |
| 2 | 74.4 | × |
| 3 | 67.6 | × |
| 4 | 61.7 | △ |
| 5 | 47.4 | ○ |
| 6 | 41.0 | ○ |
| 7 | 29.2 | ○ |
| 8 | 19.2 | ○ |
| 9 | 12.1 | ○ |

FIG. 22A
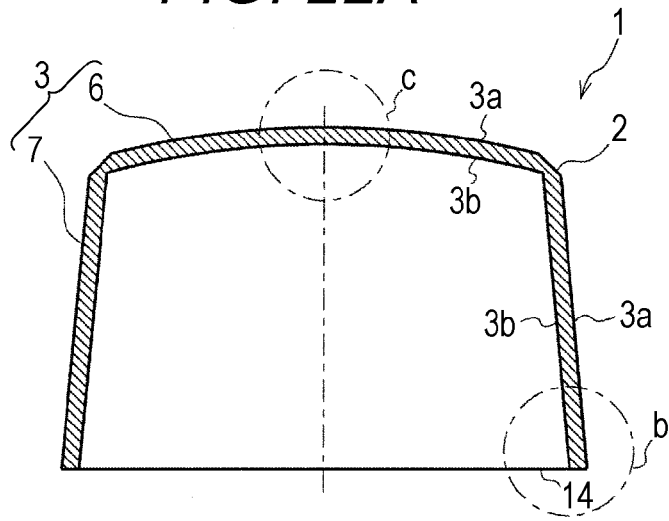
FIG. 22B1
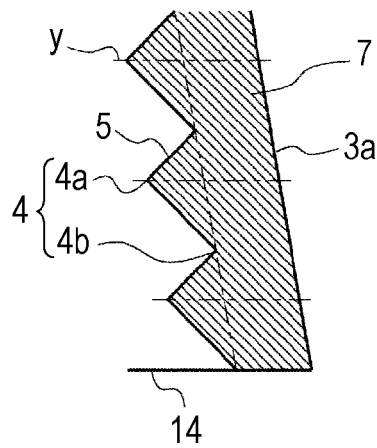
FIG. 22B2
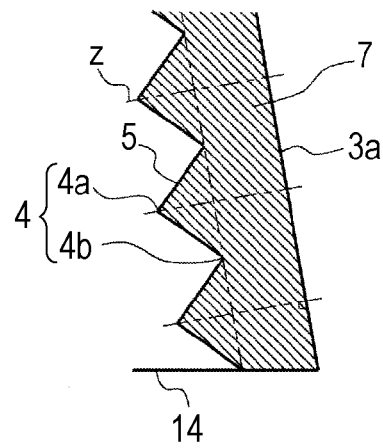
FIG. 22C1
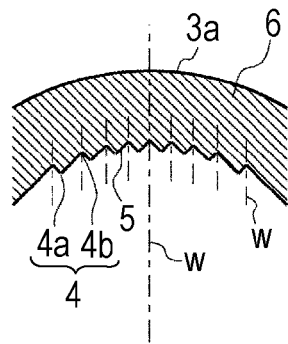
FIG. 22C2
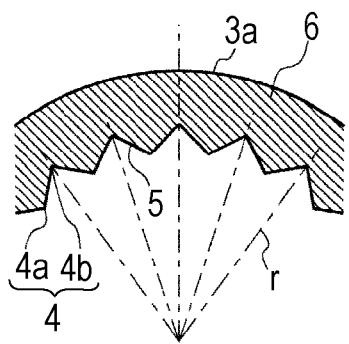

FIG. 26A1
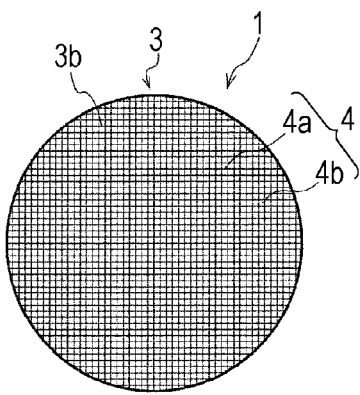
FIG. 26A2
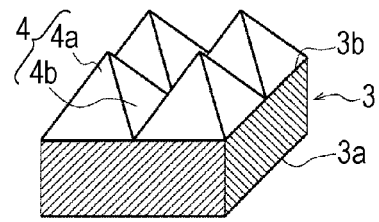
FIG. 26B1
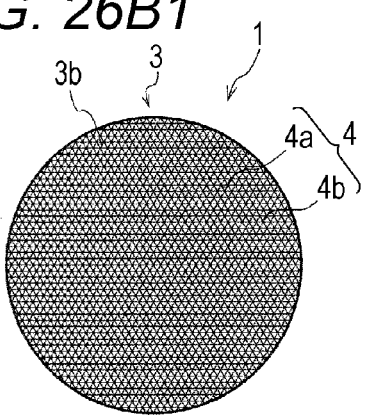
FIG. 26B2
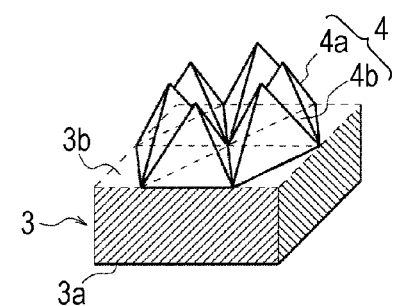
FIG. 26C1
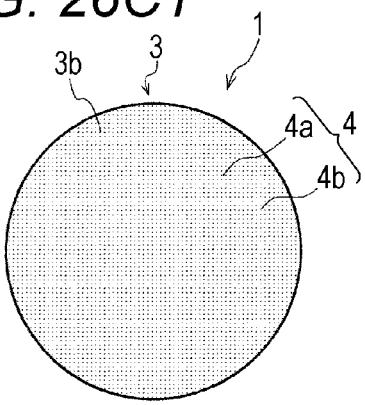
FIG. 26C2
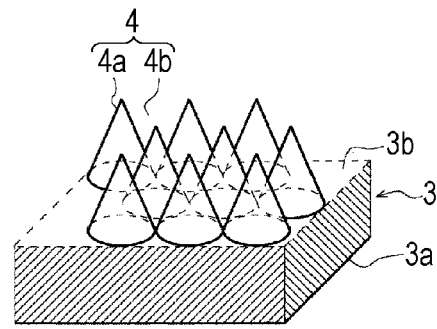

DECORATIVE PLASTIC MOLDED ARTICLE AND MANUFACTURING METHOD THEREOF

CROSS-REFERENCE TO RELATED APPLICATION

This patent specification is based on Japanese patent application, No. 2014-259382 filed on Dec. 22, 2014 in the Japan Patent Office, the entire contents of which are incorporated by reference herein.

BACKGROUND

1. Technical Field

The present invention relates to a decorative plastic molded article that can present an outer appearance of metallic color like without painting or coating the body of the molded article, and a manufacturing method thereof.

2. Description of the Related Art

Regarding decoration techniques, some methods as (1) or (2) below are known to impart an metallic color appearance to plastic molded articles which are used for cosmetic containers or their caps or the like, (1) laminating metal layers on the surface of the plastic molded article by hot stamp or deposition, (2) painting the surface of the plastic molded article which is injection molded with a metallic paint.

Hot stamp is a technique of heating a carrier film, on which metallic thin films of aluminum or the like are laminated, pressing it to the surface of the plastic molded article, and peeling off the metallic thin films from the carrier film. Thereby, laminated metallic thin films are formed on the surface of the plastic molded article.

Deposition is a technique of depositing a metal vapor, obtained by evaporating a metal such as aluminum in a vacuum container, to the surface of the plastic molded article. Thereby, a deposited film of metal is formed on the surface of the plastic molded article. Japanese Patent No. 4748470 discloses a decorative plastic molded article having deposited films composed of mainly two or more metals on the surface thereof.

The plastic molded article can present a metallic color appearance through the painting by the metallic painting film, hot stamp by the metallic thin film or deposition by the metallic deposited film, thereby endowing the product with high quality, and improving the value of the product.

However, painting, hot stamp and deposition are all secondary processing to the plastic molded article, so the number of the processes is increased, and the related cost is increased. That is, regarding the plastic molded article to be molded into a desired shape by injection molding or the like, a painting process is required for painting, a stamping process, in which the metallic thin film on the carrier film is transferred to the plastic molded article, is required for hot stamp, and a vacuum deposition process using a vacuum container is required for deposition. That is, for the painting, the hot stamp and the deposition, after the molding process for molding the plastic molded article into a desired shape, the decoration process (painting, stamping and vacuum deposition processes) for imparting the molded article a metallic color appearance is required, thus the increasing of the cost is inevitable.

Moreover, the decorative plastic molded article implemented with painting, hot stamp, and deposition consists of two elements i.e., the plastic molded article body and decorative layers (a painting film, a metallic thin film, and a metallic deposition film) laminated on the surface of the molded article body. The decorative layers and the molded article body are different in materials and thus will be affected by the temperature and humidity in the operating environment. The decorative layers will be peeled off or corroded due to the difference in thermal expansions between the molded article body and the decorative layers, or the moisture absorbing on the decorative layers, and the like. As a result, it turns into a degradation status where the color of the metal seems dim and pale, the commodity value drastically decreases, the aesthetic appearance cannot be maintained for a long time, and the durability becomes an issue.

SUMMARY

The object of the present invention is to provide a decorative plastic molded article having a metallic color appearance, free from the influence of the temperature or humidity in the operating environment, capable of stably maintaining the metallic color for a long time and promoting the cost reduction, and a manufacturing method thereof.

According to the present invention contemplated for achieving the abovementioned object, a decorative plastic molded article having light transmittance property is provided, wherein the article comprises a molded article body, said molded article body has a plate-like portion; the plate-like portion has an first surface and an second surface, opposite to the first surface, on which a small concave and convex portion is formed; the small concave and convex portion has a plurality of inclined surfaces; wherein a light from outside the molded article body enters the first surface and transmits inside the molded article body, and then reflects at the inclined surfaces toward the first surface; the refractive index of the molded article body is higher than that of a medium outside the inclined surfaces of the molded article body; characterized in that, when viewed facing to the first surface from outside, the molded article body has an outer appearance of metallic color like and a display of a character, a graph, or a symbol, wherein, the outer appearance of metallic color like is obtained by the total reflection light being a part of the reflection light at the inclined surfaces, and the display of a character, a graph, or a symbol is obtained by the light of (1) or (2) below: (1) the transmissive light through a planar transparent portion with shape of a character, a graph or a symbol formed in the small concave and convex portion; (2) the total reflection light of the small concave and convex portion with shape of a character, a graph or a symbol.

According to the decorative plastic molded article of the present invention, preferably the small concave and convex portion is formed by arranging a plurality of peaks and valleys in parallel, and at least one of the peaks or the valleys has a planar light-transmitting portion, wherein the planar light-transmitting portion enables the light entering from outside to transmit through the molded article body.

According to the decorative plastic molded article of the present invention, preferably in at least one part of the second surface of the molded article body, there are portions having different total area of the light-transmitting portions per unit area.

According to the decorative plastic molded article of the present invention, preferably the total area of the light-transmitting portions is set in a way that the light transmittance of the molded article body is in the range from 0% to 60% when the light at a wavelength of 633 nm is incident from the first surface.

According to the decorative plastic molded article of the present invention, preferably the small concave and convex portion is formed by arranging a plurality of peaks and valleys in parallel; and there are different angles, pitches or depths in the peaks or the valleys.

According to the decorative plastic molded article of the present invention, the second surface of the molded article may be a curved surface on which the small concave and convex portion is formed.

According to the decorative plastic molded article of the present invention, it may also comprise protective portions for covering the small concave and convex portion of the second surface of the molded article body.

According to the decorative plastic molded article of the present invention, preferably the small concave and convex portion is formed by arranging triangular peaks and triangular slot-shaped valleys in parallel; the refractive index N1 of the molded article body, the refractive index N2 of the medium outside the inclined surfaces of the molded article body, and the angle θ between the triangular peaks and the triangular valleys meet the following equation:

$$(2/3)((\pi/2)+\arcsin(N2/N1)) \leq \theta \leq 2((\pi/2)-\arcsin(N2/N1)).$$

According to the decorative plastic molded article of the present invention, preferably the small concave and convex portion has peaks and valleys formed by arranging a plurality of polygonal pyramids or circular cones in parallel.

The present invention also provides a method of manufacturing said decorative plastic molded article, characterized by: preparing a mold with shape of the molded article body, the small concave and convex portion and the inclined surfaces, and injection molding the molded article body having the small concave and convex portion and the inclined surfaces at one time by using the mold.

The decorative plastic molded article according to the present invention can function as follows:

(1) The small concave and convex portion, which has a plurality of inclined surfaces for reflecting, towards the first surface, the light entering from outside into the molded article body, is formed on the second surface of the molded article body made of plastics having light transmittance property. In order to generate the total refection light at the inclined surfaces, the refractive index of the molded article body is set to be higher than that of the medium outside the inclined surfaces of the molded article body. Therefore, the light entering from outside the molded article body enters the first surface and transmits inside the molded article body, and then reflects, towards the first surface, at the plurality of inclined surfaces of the small concave and convex portion formed on the second surface, thereby achieving an outer appearance of metallic color like just similar to being coated with a metal coating film when the molded article body is viewed facing to the first surface from outside.

(2) The outer appearance of metallic color like is achieved by using the total reflection light at the inclined surfaces of the small concave and convex portion formed on the molded article body made of the plastics having light transmittance property, so, there is no need to laminate decorative layers (a painting film, a metallic thin film, or a metallic deposition film) on the surface of the molded article body as done for existing products. Therefore, any problem that the decorative layers are peeled off or corroded due to the difference in thermal expansions or the moisture absorption is avoided even under the conditions of high temperature and humidity, metallic color appearance can be stably maintained for a long time, and the high durability can effect without the influence from the operating environment.

(3) Since the molded article body is one piece of single material product without requiring a decorative layers, such as the painting film, the metallic thin film, and the metallic deposition film, the molded article body can be molded by injection molding at one time, and thereby molding and decoration of the product can be performed simultaneously. As compared with the conventional product which is decorated by performing secondary processing on the molded article, the molded article body according to the present invention can be manufactured with a low cost.

(4) Since the inclined surfaces of the small concave and convex portion for carrying out total reflection is formed on a second surface at the opposite side of the first surface in the molded article body, it can reduce the possibility of damage to the inclined surfaces of the small concave and convex portion during the use of the decorative plastic molded article, and can maintain the metallic color appearance stably for a long time.

BRIEF DESCRIPTION OF THE DRAWINGS

A more complete application of the disclosure and many of the attendant advantages thereof will be readily obtained as the same becomes better understood by reference to the following detailed description when considered in connection with the accompanying drawing, wherein:

FIGS. 1A to 1C are a schematic diagram illustrating a cap used for a cosmetic container of a decorative plastic molded article according to an embodiment of the present invention, wherein FIG. 1A is a side section view, FIG. 1B is a side view, and FIG. 1C is a top view of the cap.

FIGS. 2A to 2C are a schematic diagram illustrating a cap used for a cosmetic container of the decorative plastic molded article according to another embodiment of the present invention, wherein FIG. 2A is a side sectional view, FIG. 2B is a side view, and FIG. 2C is atop view of the cap.

FIGS. 3A and 3B are a sectional view illustrating the total reflection at the inclined surfaces of the small concave and convex portion of the decorative plastic molded article, wherein FIG. 3A shows a case of twice reflection, and FIG. 3B shows a case of three times reflection.

FIGS. 4A to 4C are a schematic diagram illustrating a variant 1 in which light-transmitting portions are arranged at peaks and valleys of the small concave and convex portion, wherein FIG. 4A is a sectional view of the light-transmitting portions arranged at the peaks, FIG. 4B is a sectional view of the light-transmitting portions arranged at the valleys, and FIG. 4C is a sectional view of the light-transmitting portions arranged at the peaks and the valleys.

FIGS. 5A and 5B are a schematic diagram illustrating a variant 2 in which the total area of the light-transmitting portions per unit area in the second surface of the molded article body of the above-mentioned decorative plastic molded article is varied with each portion of the second surface, wherein FIG. 5A is a sectional view in which the light-transmitting portions are varied in unit area, and FIG. 5B is a sectional view in which the light-transmitting portions are varied in density.

FIG. 7 is a graphical chart illustrating injection molding conditions for molding a sample (the molded article body) with measured light transmittance.

FIG. 8 is a graphical chart showing the relation between the light transmittance and the metallic color degree given by the sample of FIG. 7 (variation 3).

FIGS. 9A to 9C are a schematic diagram of a variation 4 in which at least one of angles, pitches, or depths of the peaks or the valleys of the above-mentioned small concave and convex portion is varied with each portion of the second surface of the body of the molded article body, wherein FIG. 9A is a sectional view with differences between the pitches and the angles, FIG. 9B is a sectional view with differences between the depths and the angles, and FIG. 9C is a sectional view with differences between the pitches and the depths.

FIGS. 10A to 10D are the schematic diagram illustrating a variant 5 that the second surface of the aforementioned molded article body is a curved surface on which the small concave and convex portion is formed, wherein FIG. 10A is a sectional view of the small concave and convex portion that is formed on the convex curved surface; FIG. 10B is a sectional view of other small concave and convex portions that are formed on the convex curved surface; FIG. 10C is a sectional view of the small concave and convex portion that is formed on the concave curved surface; and FIG. 10D is a sectional view of other small concave and convex portions that are formed on the concave curved surface.

FIGS. 11A to 11C are a schematic diagram illustrating a variant 6 having protective portions that cover the small concave and convex portion, wherein FIG. 11A is a sectional view of the protective portions made of plates; FIG. 11B is a sectional view of the protective portions made of fillers; and FIG. 11C is a sectional view of the protective portions made of thin films.

FIGS. 13A to 13C are a schematic diagram illustrating a variant 8 of the shape of the small concave and convex portion, wherein FIG. 13A is a sectional view of the small concave and convex portion with shape of a convex arc; FIG. 13B is a sectional view of the small concave and convex portion with shape of a concave arc; and FIG. 13C is a sectional view of the small concave and convex portion with the peaks and valleys being bilaterally asymmetric.

FIGS. 14A and 14B are a schematic diagram illustrating a cap used for cosmetic container of decorative plastic molded articles according to other embodiments of the present invention, wherein FIG. 14A is a side sectional view while FIG. 14B is a bottom view of the cap.

FIGS. 15A and 15B are a schematic diagram illustrating a cap used for cosmetic container of decorative plastic molded articles according to other embodiments of the present invention, wherein FIG. 15A is a side sectional view while FIG. 15B is a bottom view of the cap.

FIGS. 16A and 16B are a schematic diagram illustrating a cap used for cosmetic container of decorative plastic molded articles according to other embodiments of the present invention, wherein FIG. 16A is a side sectional view while FIG. 16B is a bottom view of the cap.

FIGS. 17A and 17B are a schematic diagram illustrating a cap used for cosmetic container of decorative plastic molded articles according to other embodiments of the present invention, wherein FIG. 17A is a side sectional view while FIG. 17B is a bottom view of the cap.

FIGS. 18A and 18B are a schematic diagram illustrating a cap used for cosmetic container of decorative plastic molded articles according to other embodiments of the present invention, wherein FIG. 18A is a side sectional view while FIG. 18B is a bottom view of the cap.

FIGS. 19A and 19B are a schematic diagram illustrating a cap used for cosmetic container of decorative plastic molded articles according to other embodiments of the present invention, wherein FIG. 19A is a side sectional view while FIG. 19B is a bottom view of the cap.

FIGS. 20A and 20B are a schematic diagram illustrating a cap used for cosmetic container of decorative plastic molded articles according to other embodiments of the present invention, wherein FIG. 20A is a side sectional view while FIG. 20B is a bottom view of the cap.

FIGS. 21A and 21B are a schematic diagram illustrating a cap used for cosmetic container of decorative plastic molded articles according to other embodiments of the present invention, wherein FIG. 21A is a side sectional view while FIG. 21B is a bottom view of the cap.

FIGS. 22A to 22C2 is a schematic diagram illustrating a variant for the small concave and convex portion of the decorative plastic molded article according to the present invention, wherein FIG. 22A is a side sectional view of a cap used for the cosmetic container of the decorative plastic molded article, FIG. 22B1 is an enlarged view of the small concave and convex portion at the side of the cap, FIG. 22B2 is an enlarged view of a variant of the small concave and convex portion at the side of the cap, FIG. 22C1 is an enlarged view of the small concave and convex portion at the top of the cap, and FIG. 22C2 is an enlarged view of a variant of the small concave and convex portion at the top of the cap.

FIGS. 23A to 23C are a schematic diagram illustrating a cap for the cosmetic container used as the decorative plastic molded article according to other embodiments of the present invention, wherein FIG. 23A is a side sectional view, FIG. 23B is aside view, and FIG. 23C is atop view of the cap.

FIGS. 24A to 24C show a schematic diagram illustrating a cap for the cosmetic container used as the decorative plastic molded article according to other embodiments of the present invention, wherein FIG. 24A is a side sectional view, FIG. 24B is aside view, and FIG. 24C is atop view of the cap.

FIGS. 26A1 to 26C2 show a schematic diagram illustrating a variant of the small concave and convex portion of the decorative plastic molded article according to the present invention, wherein FIG. 26A1 is a top view of a circular plate with a plurality of 90° crossed V-shaped slots being formed on the second surface, FIG. 26A2 is a partially enlarged stereogram of FIG. 26A1, i.e. a schematic diagram showing that the small concave and convex portion is a rectangular pyramid, FIG. 26B1 is a top view of a circular plate with a plurality of 120° crossed V-shaped slots being formed on the second surface, FIG. 26B2 is a partially enlarged stereogram of FIG. 26B1, i.e. a schematic diagram showing that the small concave and convex portion is a triangular pyramid, FIG. 26C1 is a top view of a circular plate with a plurality of circular cones being formed on the second surface, FIG. 26C2 is a partially enlarged stereogram of FIG. 26C1, a schematic diagram showing that the small concave and convex portion is a circular cone,

DESCRIPTION OF THE EMBODIMENTS

Figure 1A:
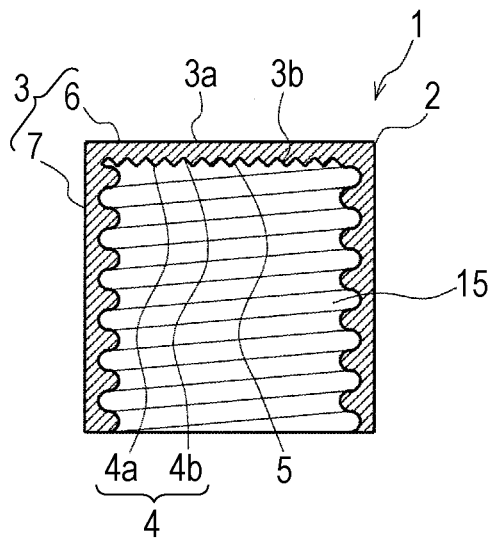

In the following detailed description, for purpose of explanation, numerous specific details are set forth in order to provide a through understanding of the disclosed embodiments. It will be apparent, however, that one or more embodiments may be practiced without these specific details. In other instances, well-known structures and devices are schematically shown in order to simplify the drawing.

The most preferred embodiments of the present invention will be explained in detail below with reference to the accompanying drawings. Sizes, materials, and other specific values given by related embodiments are intended for readily understanding the present invention, unless otherwise specified, no limitation should be made to this invention. In addition, in this specification and the accompanying drawings, the same reference numerals will be used to refer to the elements substantially having the same function and construction, duplicate explanations are omitted, and the figures for elements which are not directly related to the present invention are omitted.

(Summary of the Decorative Plastic Molded Article 1 According to an Embodiment of the Present Invention)

Figure 1B:
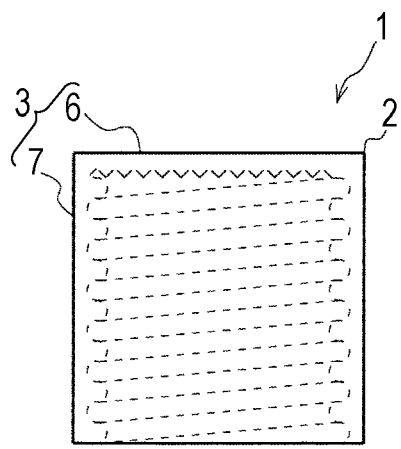
Figure 1C:
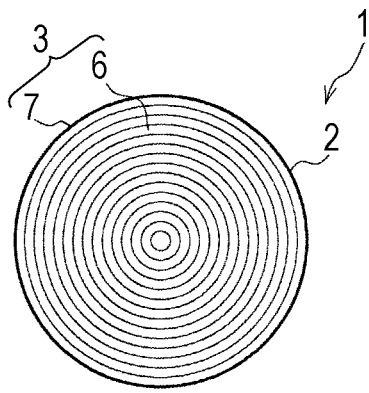

FIGS. 1A to 1C show a cap 2 used for the cosmetic container (hereafter also referred to as a cap for short) according to the decorative plastic molded article 1 of an embodiment of the present invention. The cap 2 is mounted in the opening portion of the cosmetic container, and has an internal thread portion 15 for threaded connection with an outer thread portion formed by the opening portion of the cosmetic container. The cap 2, as stated below, is a decorative plastic molded article 1 which obtains a metallic color appearance without painting or coating a film on the molded article body 3 formed by injection molding.

The cap 2 used for a cosmetic container according to the present embodiment is made of plastics having light transmittance property, and is provided with a molded article body 3 with an first surface 3a facing towards outside and an second surface 3b in the opposite side, and a small concave and convex portion 4 formed on the second surface 3b of the molded article body 3. The small concave and convex portion 4 has plurality of inclined surface 5 for reflecting the light incident to the molded article body 3 from the first surface 3a towards the first surface 3a; the refractive index of the molded article body 3 is higher than the refractive index of the medium outside medium outside the inclined surfaces 5, so as to totally reflect the light incident to the molded article body 3 from the first surface 3a on the inclined surfaces 5. In addition, in order for easily understanding the shape of the small concave and convex portion 4, the small concave and convex portion is illustrated much larger than the real object in the drawings used in the description. Also, the small concave and convex portion 4 of the second surface 3b that can be perspective from the outside of the molded article body 3 is depicted in solid lines.

(The Molded Article Body 3)

As shown in FIGS. 1A to 1C, the molded article body 3 serving as the cap 2 is composed of a disc-shaped top plate 6 and a cylindrical side plate 7, and is formed by injection molding with plastics having light transmittance property as the raw material. Wherein, "having light transmittance property" is a concept including both colorless transparency and colored transparency.

In a colorless transparent material, a silver metallic color is generated by the total reflection at the inclined surfaces 5 of the small concave and convex portion 4; and in a colored transparent material (such as blue, red, or yellow), a silver metallic color added to the original color is generated by the total reflection at the inclined surfaces 5.

Also, the term "plastic" of the present description, in addition to the thermoplastic resin (polyethylene, polypropylene, polyvinyl chloride, polyester, etc.), further comprises a thermosetting resin (phenol resin, polyurethane, a thermosetting polyimide, etc.). The molded article body 3 has the first surface 3a facing towards outside and the second surface 3b in the opposite side. In the molded article body 3 shown in FIGS. 1A to 1C, the first surface 3a is formed by an upper face of the top plate 6, and the second surface 3b is formed by a lower face of the top plate 6.

(The Small Concave and Convex Portion 4)

As shown in FIGS. 1A to 1C, the second surface 3b (the lower face of the top plate 6) of the molded article body 3 is formed with the small concave and convex portion 4. The small concave and convex portion 4 is simultaneously formed by means of the mold for injection molding when the molded article body 3 is formed into the desired shape (the shape of the cap 2 in this embodiment) by injection molding with plastics having light transmittance property as the raw material. That is, the mold is formed with not only the shape of the molded article body 3, but also the shapes of the small concave and convex portion 4 and the inclined surfaces 5. The small concave and convex portion 4 and inclined surfaces 5 are formed on the second surface 3b (the lower face of the top plate 6) of the molded article body 3 by means of the mold for injection molding at the same time when the molded article body 3 is formed into the desired shape (the shape of the cap 2 in this embodiment). Hence, there is no need to perform the secondary processing on the molded article body 3 to form the small concave and convex portion 4 and the inclined surfaces 5. In addition, the internal thread portion 15 is also formed during the injection molding.

Figure 2A:
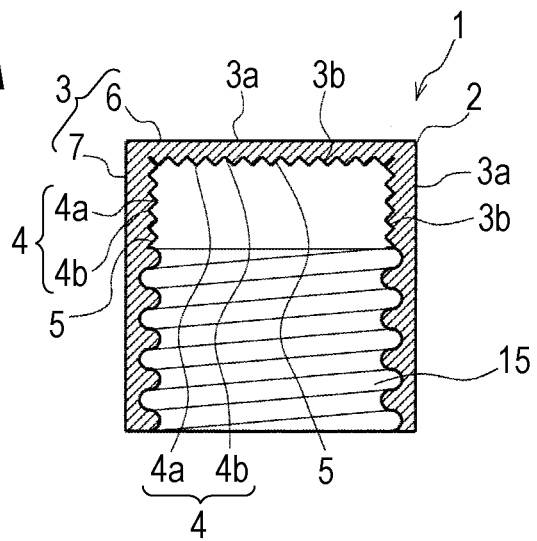
Figure 2B:
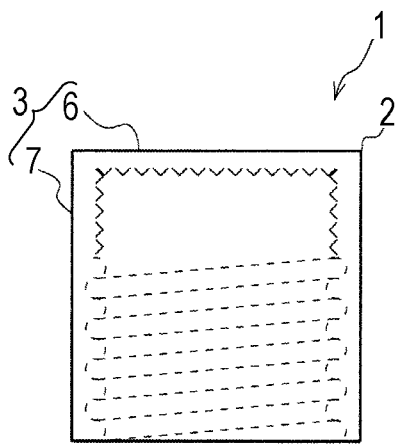
Figure 2C:
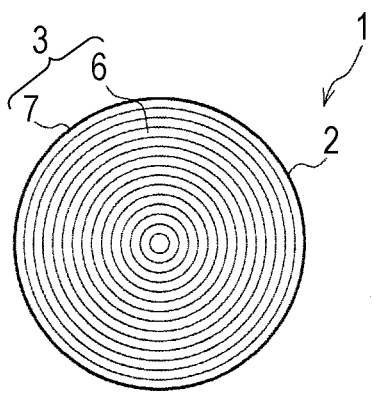

The small concave and convex portion 4 is formed by arranging a plurality of peaks 4a and valleys 4b whose cross sections are triangle-shaped. Although the small concave and convex portion 4 of the top plate 6 is formed by a plurality of concentric circle-shaped peaks 4a and valleys 4b in this embodiment, the peaks 4a and the valleys 4b can also be formed into spiral types. In addition, it can also be as shown in the embodiment in FIGS. 2A to 2C, the small concave and convex portion 4 is also formed in the inner face (corresponding to the second surface 3b) of the side plate 7 of the molded article body 3. In the cap 2 in the embodiment shown in FIGS. 2A to 2C the internal thread portion 15 is formed from the lower end of the side plate 7 of the molded article body 3 towards the upper end until the middle part, and the small concave and convex portion 4 is formed at the upper face thereof. The small concave and convex portion 4 of the side plate 7 is formed by a plurality of peaks 4a and valleys 4b formed in an annular manner in the circumferential direction. Since the embodiment of FIGS. 2A to 2C are substantially the same as the embodiment of FIGS. 1A to 1C except for the small concave and convex portion 4 of the side plate 7, a detailed description thereof is omitted.

The cross-sections of the peaks 4a and valleys 4b consisting the small concave and convex portion 4 are formed in triangle shapes, the height of the peaks 4a (the depth of valleys 4b) is 10-100 μm, the ratio of the depth of the valleys 4b (the height of the peaks 4a) to the gap (pitch) among the peaks 4a (among the valleys 4b), i.e., the aspect ratio is less than 2. The aspect ratio corresponds to the "slot depth/slot width" of the valleys 4b. The good liftability of the mold can be ensured during injection molding when the aspect ratio is set to be less than 2. In addition, the angle of the peaks 4a (the angle of the valleys) is 45 to 135 degrees, which also facilitates ensuring the good liftability.

(The Inclined Surfaces 5)

Figure 3A:
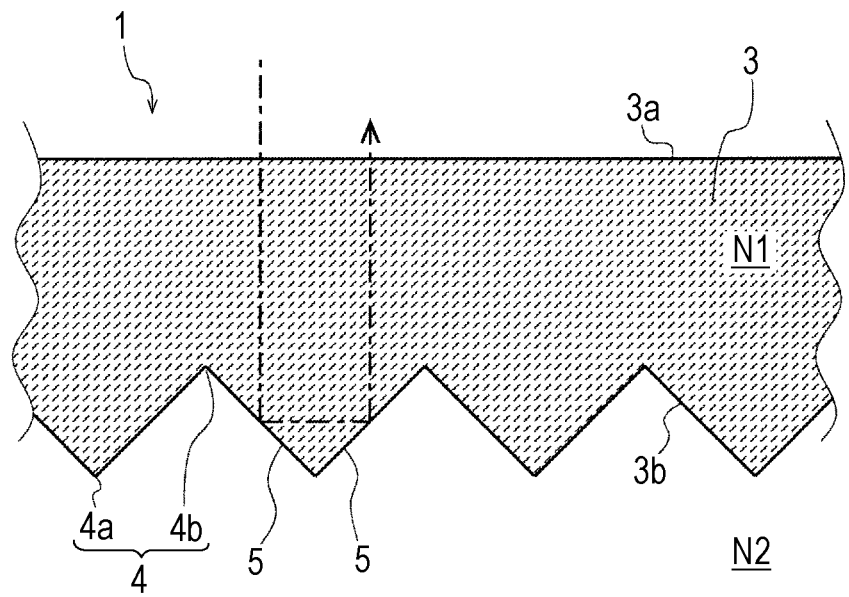
Figure 3B:
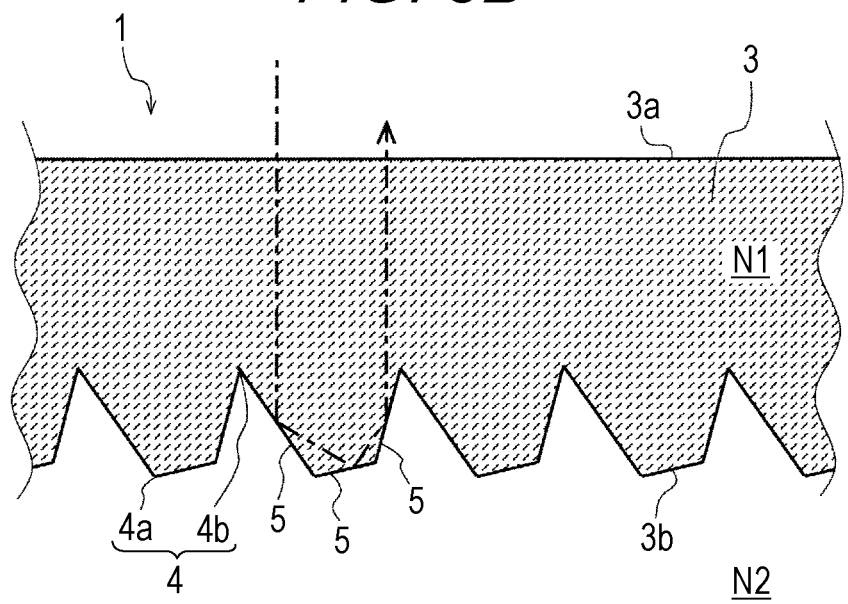

As shown in FIGS. 3A and 3B, a plurality of inclined surfaces 5 are formed on the small concave and convex portion 4 to reflect the light (indicated by the dot and chain line) entering from the first surface 3a towards the first surface 3a. The inclined surface 5 is a slope (plane) formed from the top of the peak 4a to the bottom of the valley 4b. The inclined surfaces 5 as shown in FIG. 3A are grouped by a pair (two), and are formed through an approach of totally reflecting the light from the first surface 3a to the molded article body 3 twice so as to return to the side of the first surface 3a. However, it can also be formed as shown in FIG. 3B: 3 or more of the inclined surfaces 5 are as a group, the light from the first surface 3a into the molded article body 3 is totally reflected for three or more times so as to return to the side of the first surface 3a. In addition, the incident light and the reflected light can be unparallel. As described above, the inclined surfaces 5 and the small concave and convex portion 4 are simultaneously formed by means of the mold for injection molding when the molded article body 3 is formed into the desired shape (the shape of the cap 2 in this embodiment) by injection molding.

(The Refractive Index)

As shown in FIGS. 3A and 3B, in order to allow the total reflection of light from the first surface 3a to molded article body 3 at the inclined surfaces 5, it is necessary to set the refractive index N1 of a molded article higher than the refractive index N2 of the medium outside the inclined surfaces 5 (N1>N2). Here, the "total reflection" means: when light enters from a medium with the higher refractive index to a medium with lower refractive index, it does not transmit through the interface but is totally reflected at the interface. Since in the present embodiment, the medium outside the inclined surfaces 5 is air (refractive index of about 1.0), the material of the molded article body 3 is necessary to use a transparent material with a refractive index higher than 1.0. For example, polyethylene, polypropylene, and polyurethane with refractive index of about 1.5 or optical plastics, polymethyl methacrylate resin, polycarbonate, cycloolefin resin, polyester etc. with refractive index of about 1.6 can be used as the material of the molded article body 3.

(Operation and Effect)

In the decorative plastic molded article 1 described in the FIGS. 1A to 3B, in order to form the small concave and convex portion 4 which makes light entering from outside into the molded article body 3 be reflected towards a plurality of first surfaces in the second surface 3b of the molded article body 3 formed by plastics having light transmittance property, leading to the total reflection on the inclined surfaces 5, the refractive index N1 of the molded article body 3 is set to be higher than the refractive index N2 of the medium outside the inclined surfaces 5. Therefore, light entering from the first surface 3a of the molded article body 3 is totally reflected at the plurality of inclined surfaces 5 of the small concave and convex portion 4 formed in the second surface 3b towards the first surface 3b, the metallic color appearance of molded article body 3 similar to the metal film can be observed from the first surface 3a.

According to decorative plastic molded article 1 in the present embodiment, the molded article body 3 made of plastics having light transmittance property has a metallic color appearance by the use of the total reflection light at the inclined surfaces 5 formed on the small concave and convex portion 4, and it is not necessary to form a decorative layer (the painting film, metallic thin film, metallic deposition film, etc.) on the surface of the molded article body 3 as the existing products. Therefore, such problems as peeled off or corroded of the decorative layers due to the difference in thermal expansions or the moisture absorption even under the conditions of the high temperature and humidity, the metallic color appearance can be stably maintained for a long time, and the high durability can effect free from the operating environment.

In the decorative plastic molded article 1 according to the present embodiment, since deposition the molded article body is composed of one piece of a single material of plastics having the light transmittance property and does not require a decorative layer such as the painting film, the metallic thin film, or the metallic deposition film, the body 3 of the molded article can be molded with the small concave and convex portion 4 and the inclined surfaces 5 at one time. So, the product molding and the decoration can be performed at the same time. Therefore, compared with the conventional product which is decorated through performing a secondary processing on the molded article (painting, hot stamping formation, deposition), decorative plastic molded article 1 according to the present embodiment can be manufactured with a low cost.

According to the decorative plastic molded article 1 of the present embodiment, since the inclined surfaces 5 (an important constitution element in the present invention) of the small concave and convex portion 4 for carrying out total reflection is formed on an second surface 3b at the opposite side of the first surface 3a in the body 3 of the molded article, the state of being protected by the molded article body 3 is shown and it can reduce the possibility of damage to the inclined surfaces 5 of the small concave and convex portion 4 during the use of the decorative plastic molded article 1, and can maintain the metallic color appearance stably for a long period of time.

(Variants)

Variants of the present invention are shown hereinafter. Explanation to the basic structure of these variants, like the embodiments described, will be omitted with only the differences retained. In addition, explanation to the basic work effect of these variants, like the embodiments described, will be omitted with only the work effect based on differences retained.

(Variant 1)

Figure 4A:
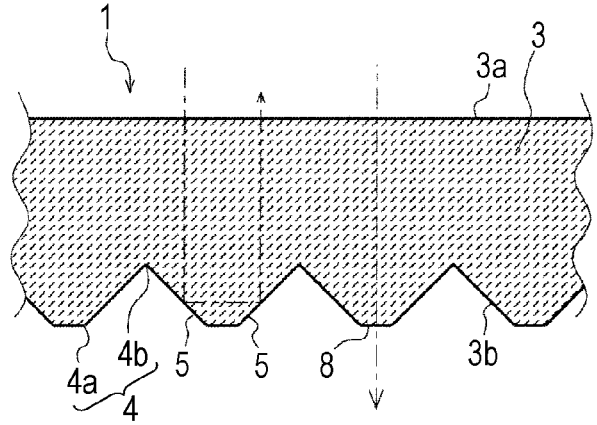
Figure 4B:
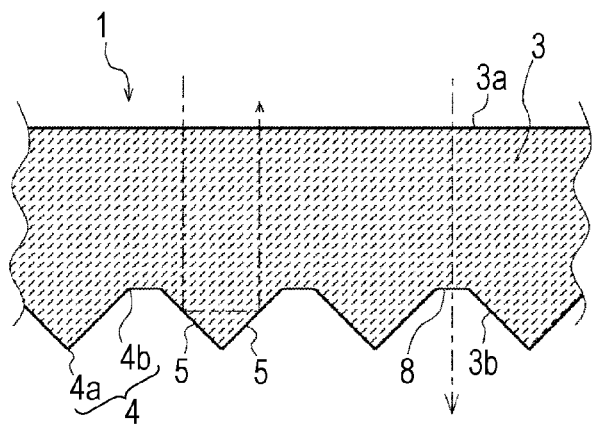
Figure 4C:
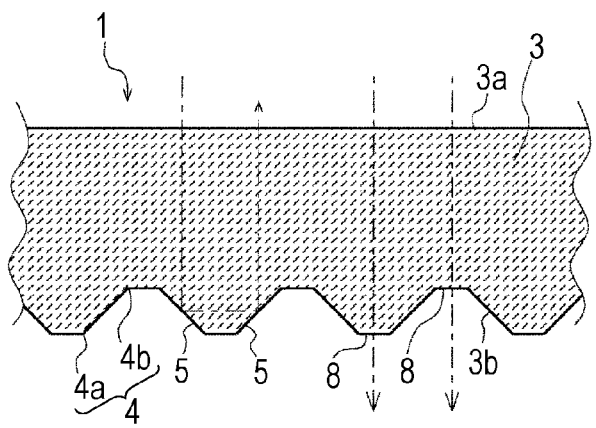

Variant 1 of the present invention is shown in FIGS. 4A to 4C. According to the decorative plastic molded article 1 of variant 1, the small concave and convex portion 4 is formed by arranging a plurality of peaks 4a and valleys 4b in parallel, and at least one of the peaks 4a and the valleys 4b is provided with a plurality of planar light-transmitting portions 8 to enable the light entering from outside to transmit though. FIG. 4A gives the example of providing a light-transmitting portion 8 at the peaks 4a, FIG. 4B gives the example of providing a light-transmitting portion 8 at the valleys 4b, and FIG. 4C gives the example of providing a light-transmitting portion 8 at the peaks 4a and the valleys 4b.

According to the decorative plastic molded article 1 of variant 1, since the transmission rate (full transmission rate) of the light entering from outside to transmit through the body 3 of the molded article can be adjusted by corresponding to the number or area of light-transmitting portions 8, the brightness degree of metallic color (total reflection degree) when viewed facing to the first surface 3a from outside can be varied by adjusting the number or area of the light-transmitting portions 8 to expand the aesthetic range. In addition, when the molded article body 3 is molded into a desired shape through the injection molding with the plastics having light transmittance property as the raw material, and the planar light-transmitting portions 8 can be formed with the small concave and convex portion 4 and the inclined surfaces 5 simultaneously by means of using the mold formed with the shape of the light-transmitting portions 8 or adjusting the temperature of the mold or twigs.

(Variant 2)

Figure 5A:
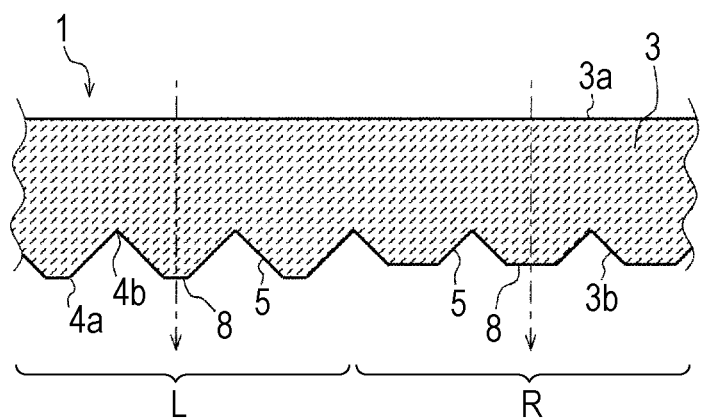
Figure 5B:
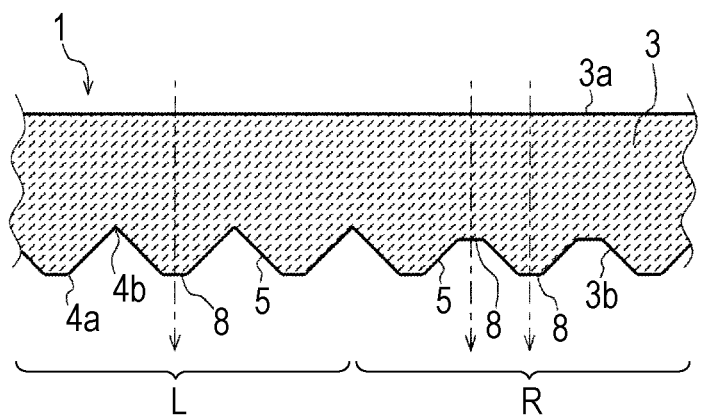

Variant 2 of the present invention is shown in FIGS. 5A and 5B. According to the decorative plastic molded article 1 of variant 2, the total area monomer area×number) of the light-transmitting portions 8 per the unit area (e.g. 1 square millimeters) of the second surface 3b of the molded article body 3 varies based on each portion of the second surface 3b. FIG. 5A gives an example showing changes in the monomer area of the light-transmitting portions 8, and FIG. 5B gives an example showing changes in the density of light-transmitting portions 8 (the number per unit area).

In FIG. 5A, the area of the light-transmitting portions 8 is described as small in the left portion L and large in the right portion R. Accordingly, light transmittance of the left portion L is low, light transmittance of the right portion R is high, and brightness degree of metallic color becomes different when the molded article body 3 is viewed facing to the first surface 3a from outside the molded article body 3. In addition, the light-transmitting portions 8 can be formed at the valleys 4b rather than at the peaks 4a. In a further aspect, FIG. 5B shows an example of changes in density of the light-transmitting portions 8, the light-transmitting portions 8 are only formed at the peaks 4a in the left portion L, while the light-transmitting portions 8 are formed at both the peaks 4a and the valleys 4b in the right portion R. Accordingly, light transmittance of the left portion L is low, light transmittance of the right portion R is high, and brightness degree of metallic color becomes different when the molded article body 3 is viewed facing to the first surface 3a from outside the molded article body. In addition, in in the left portion L of FIG. 5B, the light-transmitting portions 8 can be formed at the valleys 4b rather than at the peaks 4a.

According to the decorative plastic molded article 1 of variant 2, the total area of the light-transmitting portions 8 per unit area in the second surface 3b of the molded article body 3 is varied as each portion of the second surface 3b, hereby, the brightness degree of metallic color when the molded article body 3 is viewed facing to the first surface 3a from outside the molded article body can be changed according to each portion of the molded article body 3, to expand the aesthetic range.

(Variant 3)

Figure 6:
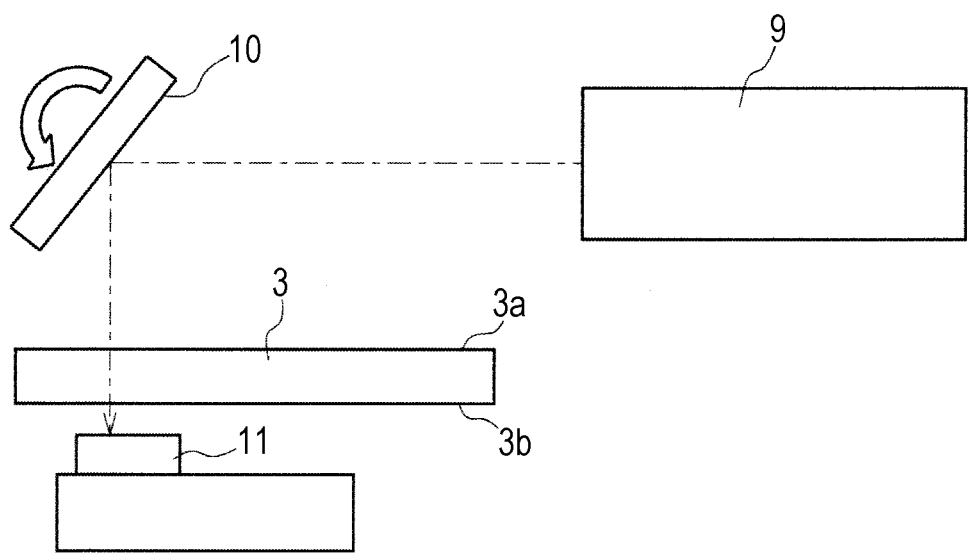
FIG. 6 is a schematic diagram illustrating a system for measuring light transmittance of the molded article body.

In variant 1 of FIGS. 4A to 4C and variant 2 of FIGS. 5A and 5B, it is described as: the light transmittance of the molded article body 3 may be adjusted by changing area or number of the light-transmitting portions 8, which can adjust the brightness degree of metallic color. According to the experiments and research of the inventor, it is found out that: suitable brightness degree of metallic color may be obtained when the molded article body 3 is viewed facing to the first surface 3a from outside the molded article body by setting the light transmittance within the range of 0-60%. FIG. 6 shows a system for measuring the light transmittance of the molded article body 3, FIG. 7 shows molding conditions for injection molding various molded article bodies 3 (sample) with different light transmittance, and FIG. 8 shows the relationships between light transmittance and metallic color degree of each sample.

FIG. 6 shows a system for measuring the light transmittance (light ray transmittance) of the molded article body 3. In the system, the light emitted by the laser generator 9 (wavelength 633 nm, beam diameter 1 mm, indicated with dotted lines) reflects at the lens 10 for adjusting an incident angle of the light and transmits (pass) through the molded article body 3 installed as the sample, and its light intensity after transmitting though the molded article body 3 is measured by the light intensity meter 11. When the molded article body 3 (plate-shaped) is installed, the first surface 3a is on the top, and the second surface 3b in on the bottom; and the angle of the emitting lens 10 is adjusted so as to allow vertical incidence of the laser light on the molded article body 3. The experimental steps are as follows: (1) light intensity (reference light intensity) is measured without any sample by the light intensity meter 11; (2) Installing the sample, and the light intensity after transmitting though the sample is measured; and (3) it can be obtained from the above measured results that "light transmittance=(transmitting light intensity)/(reference light intensity)."

FIG. 7 shows molding conditions (mold shape, mold temperature and resin temperature) for injection molding various molded article body 3 (sample) with different light transmittance. For all samples (1-9), the resin is PS (polystyrene).

For samples 7 to 9, the shapes of the molds are the same, but the temperatures of the molds are different. The mold with the following shape is used: the width of the V-shaped slot for molding the small concave and convex portion 4 shown in FIG. 4A is 60 μm, the depth of the V-shaped slot is 30 μm, and the width of the flat portion for molding the light-transmitting portions 8 is 0 (zero). When the mold temperature is high, the replication rate is high, and the ratio of exact replicating V-shaped slot of the mold in the molded article body 3 is high, so the reflectivity based on the total reflection is high, and the light transmittance is low. On the other hand, when the mold temperature is low, the replication rate becomes low, the V-slot shape of the mold cannot be sufficiently replicated in the molded article body 3, as a result, the light-transmitting portions 8 will be molded on the top of the peaks 4a (see FIG. 4A), and the light transmittance becomes high. Consequently, based on the order of samples 7, 8 and 9, the ratio of molding the light-transmitting portions 8 in the molded article body 3 becomes high successively, and the light transmittance becomes high successively.

For sample 6, the mold with the following shape is used: the width of the V-shaped slot is 30 μm, the depth of the V-shaped slat is 15 μm, the width of flat portion for molding the light-transmitting portions 8 is 10 μm, and the mold temperature is set to be lower than the sample 7. Consequently, the ratio of molding the light-transmitting portions 8 in the molded article body 3 is higher than the sample 7, and the light transmittance is also higher than the sample 7.

For sample 5, the used mold is the same as that in samples 7 to 9, and the mold temperature is set to be lower than the sample 6. Consequently, the ratio of molding the light-transmitting portions 8 in the molded article body 3 is higher than the sample 6, and the light transmittance is also higher than the sample 6.

For samples 3 and 4, the used mold is the same as that in the samples 5, and 7 to 9, the mold temperature is the same as that in the sample 5, and the resin temperature is set to be lower than the sample 5. Further, sample 3 uses VP4.8, and sample 4 uses VP4.3. Here, V in VP refers to Velocity, P refers to Pressure, and VP (VP switch position) refers to the position switched from V (injection velocity) to P (pressure maintenance, pressure maintaining). By setting VP of sample 3 as 4.8, setting VP of sample 4 as 4.3, as compared with sample 4, pressure maintenance of sample 3 is lower, the molding of the light-transmitting portions 8 in the molded article body 3 becomes easier, and light transmittance becomes higher.

For sample 2, the mold with the following shape is used: the width of the V-shaped slat is 60 μm, the depth of the V-shaped slot is 30 μm, the width of flat portion for molding the light-transmitting portions 8 is 10 μm, and the mold temperature and resin temperature are the same as those for samples 3 and 4. Consequently, the ratio of molding the light-transmitting portions 8 in the molded article body 3 is higher than that of the sample 3, and light transmittance is also higher than that of the sample 3.

For sample 1, the flat mold without the V-shaped slot is used. Hence, there is no small concave and convex portion 4 (peak portion 4a and valley portion 4b) molded in the molded article body 3, and the light transmittance is higher than the sample 2.

The samples 1 to 9 (the molded article body 3) are mounted to the light transmittance measuring system shown in FIG. 6 respectively, and light transmittances are measured respectively. The measurement result is given by right column of FIG. 7. The light transmittances become higher from sample 9 to the sample 1 in the order successively.

FIG. 8 shows the relationship between light transmittance and the degree of metallic color of samples 1 to 9 (the molded article body 3). FIG. 8 is made, based on the answer regarding the degree of metallic color by an observer (monitor) who observed samples 1 to 9 (the molded article body 3). With regard to the degree of metallic color (○, Δ, x), ○ represents the answer of "the degree of metallic color is high", x represents the answer of "the degree of metallic color is low", and Δ represents the answer of "the degree of metallic color is neither high nor low". As shown in FIG. 8, it has been found that the degree of metallic color is ○ for the light transmittance lower than 47.4%, and x for the light transmittance higher than 67.6%. Additionally, it has further been found that the degree of metallic color is Δ for the light transmittance of 61.7%.

Based on the experimental results, in the decorative plastic molded article 1 according to the present invention, it is appropriate for the molded article body 3 to set the total area (unit area×number) of the light-transmitting portions 8 in a way that light transmittance of the light at a wavelength of 633 nm is in the range of 0%-60%. Such a decorative plastic molded article 1 is used as Variant 3 of the present invention. Additionally, although light transmittance is 0% and light reflectance is 100% is not possible in practice, it is contemplated in the specification that it means the total area of the light-transmitting portions 8 is zero.

If the light transmittance is in the range of 0% to 60%, when viewed facing to the first surface 3a from outside the molded article body 33a, the see-through ratio and the reflex luminescence ratio are the best, and the suitable metallic color is obtained, thereby improving the appearance. That is, if the light transmittance exceeds 60%, when viewed facing to the first surface 3a outside the molded article body 3, it is in the state that the objects in the second surface 3b of the molded article body 3 made by the plastics having the light transmittance property is see-through, rather than it seems like to be the metallic color due to total reflection, therefore, the degree of metallic color is low, and appearance is degraded. However, if the light transmittance is lower than 60%, it is in the state that it seems like to be the metallic color due to total reflection, rather than the interior is see-through, therefore, the degree of metallic color is high, and the appearance becomes better. Additionally, more preferably, the light transmittance is in the range of 0%-50%. If the light transmittance is lower than 50%, when viewed facing to the first surface 3a from outside the molded article body 3, the ratio of seeming like the metallic color due to total reflection is higher than that of the interior being see-through, thereby ensuring a more aesthetically pleasing appearance.

(Variant 4)

Figure 9A:
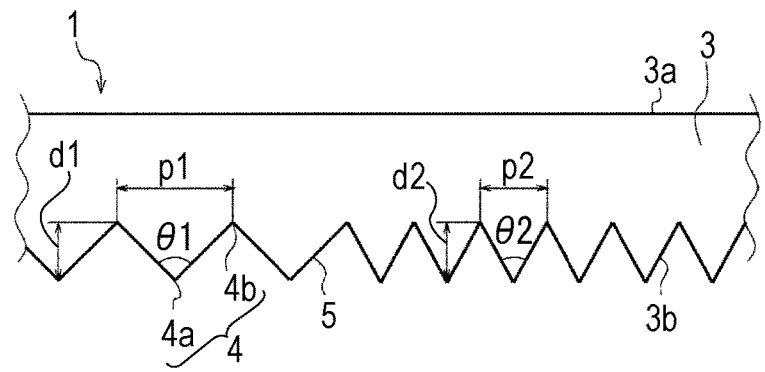
Figure 9B:
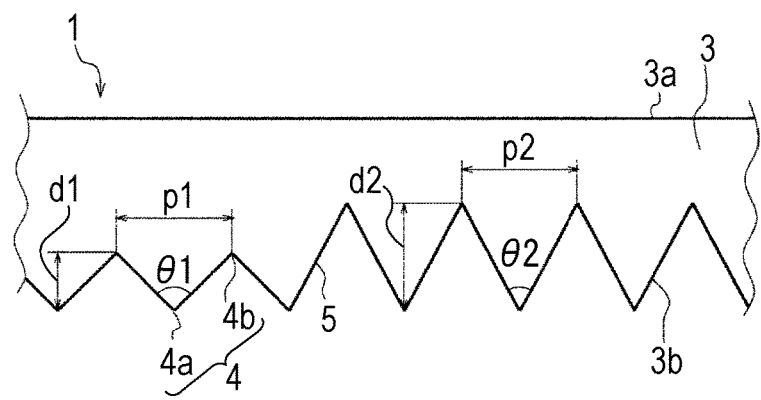
Figure 9C:
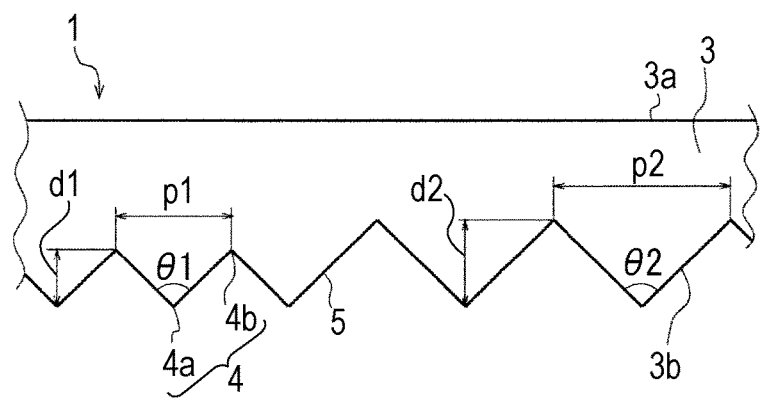

Variant 4 of the present invention is shown in FIGS. 9A to 9C. In the decorative plastic molded article 1 according to Variant 4, the small concave and convex portion 4 is formed by arranging a plurality of peaks 4a and valleys 4b in parallel. At least one of the angle θ, pitch p and depth d of peaks 4a and valleys 4b may vary from each portion of the second surface 3b of the body 1 of the molded article. FIG. 9A shows an example in which the pitch p and the angle θ are different, FIG. 9B shows an example in which the depth d and the angle θ are different, and FIG. 9C is shows an example in which the pitch p and depth d are different.

FIGS. 9A to 9C, for the left portion of the molded article body 3, the pitch is set as p1, the angle is set as θ1, and the depth is set as d1, and for the right portion of the molded article body 3, the pitch is set as p2, the angle is set as θ2, and the depth is set as d2. Then in FIG. 9A, p1>p2, θ1>θ2, and d1=d2; in FIG. 9B, p1=p2, θ1>θ2, and d1<d2; and in FIG. 9C, p1<p2, θ1=θ2, and d1<d2.

According to the decorative plastic molded article 1 of variant 4, at least one of angle θ of peaks 4a and valley 4b, pitch p, and depth d of peaks 4a and valleys 4b is different due to each portion of the second surface 3b of the molded article body 1, a. Accordingly, metallic color degree of the molded article body 3 when viewed facing to the first surface 3a from outside the molded article body 3 can be changed according to each part portion of molded part main the molded article body 3. That is, since parts with high metallic color degree and parts with metallic color degree are mixed and co-existed due to the molded article body 3, it is possible to expand the aesthetic range. In addition, since there is a case that angle θ of the peaks 4a and valleys 4b is different leading to no total reflection, internal perspective portion can be added in the molded article body 3 in addition to parts with high metallic color degree and parts with low metallic color degree.

(Variant 5)

Figure 10A:
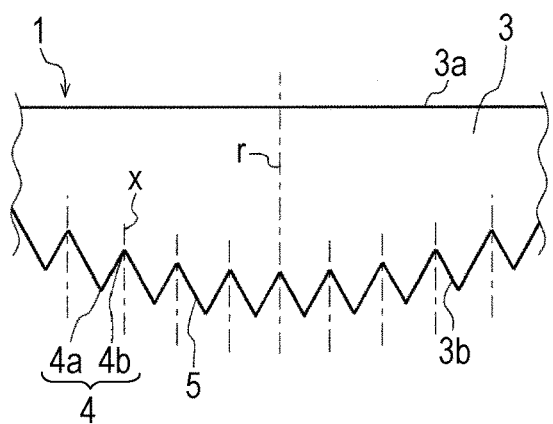
Figure 10B:
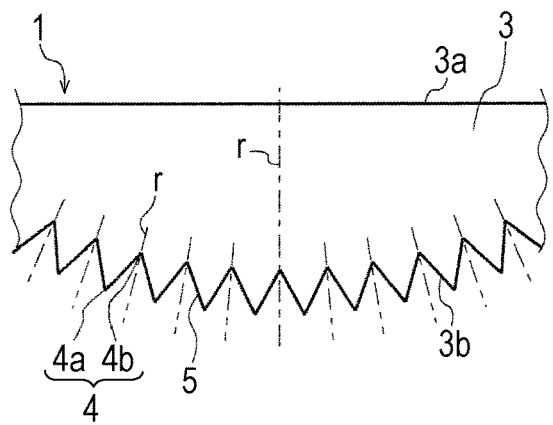
Figure 10C:
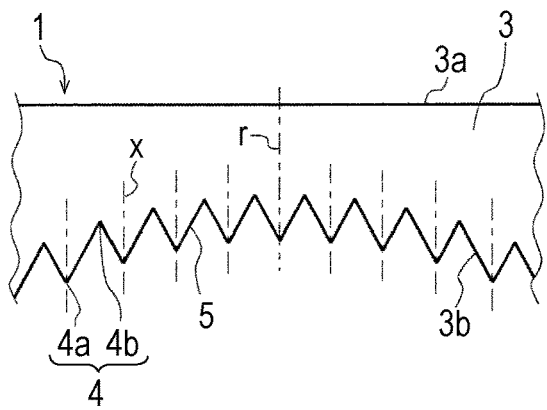
Figure 10D:
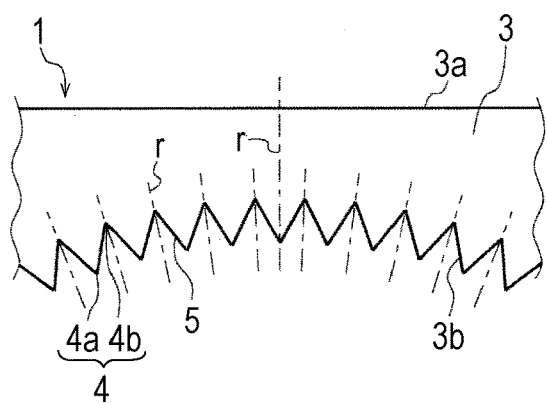

FIGS. 10A to 10D show a variant 5 of the present invention. According to the decorative plastic molded article 1 of the variant 5, the second surface 3b of the molded article body 1 is a curved surface, the curved surface has a small concave and convex portion 4. FIGS. 10A and 10B show the example of the small concave and convex portion 4 formed along the convex curved surface, and FIG. 10C and FIG. 10D show the example of the small concave and convex portion 4 formed along the concave curved surface.

In FIG. 10A, the peaks 4a and valleys 4b of the small concave and convex portion 4 are formed by a symmetrical angle with the baseline x parallel to the radius r of curved arc as the center. In FIG. 10B, the peaks 4a and valleys 4b are formed by the symmetrical angle with radius r of curved arc as the baseline. In FIG. 10C, the peaks 4a and valleys 4b are formed by a symmetrical angle with the baseline x parallel to the radius r of curved arc as the center. In FIG. 10D, the peaks 4a and valleys 4b are formed by the symmetrical angle with radius r of curved arc as the baseline. In addition, in FIG. 10A and FIG. 10C, the baseline x is perpendicular to the surface of the first surface 3a of the molded article body 3.

According to the decorative plastic molded article 1 of a variant 5, since the small concave and convex portion 4 is formed into a curved surface, the incident angle of the line of sight when viewed facing to the first surface 3a from outside the molded article body 3 is different due to the different portion of the small concave and convex portion 4. Therefore, the degree of total reflection, i.e., the metallic color degree, changes due to the different portions, which can extend the aesthetic range.

In addition, in the decorative plastic molded article 1 of FIGS. 10A and 10C, since the peaks 4a and valleys 4b of the small concave and convex portion 4 constitute an symmetrical angle with the baseline x parallel to the radius r of curved arc as the center, manufacturability of the mold for injection molding is improved than that in the type shown in FIGS. 10B and 10D, thereby advantageously reducing costs. That is, when the mold for injection molding the molded article 1 of FIGS. 10A and 10C is manufactured, it is enough to simply move a cutting tool for cutting the peaks 4a and valleys 4b (two dimensional xy movement control). Moreover, for the manufacture of a mold used for the molded article 1 in FIGS. 10B and 10D, peak 4a and valleys 4b cannot be cut unless the cutting tool is complicatedly controlled (xyθ movement control).

(Variant Example 6)

Figure 11A:
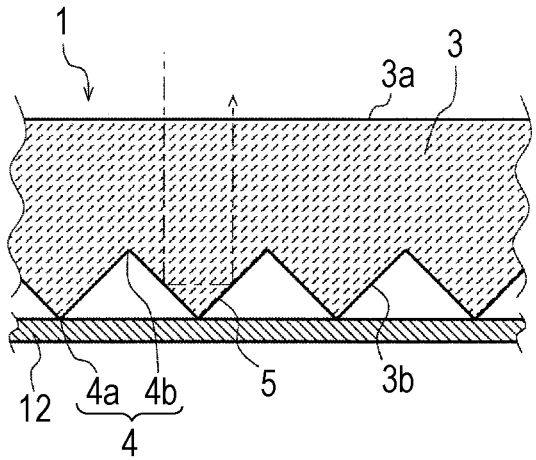
Figure 11B:
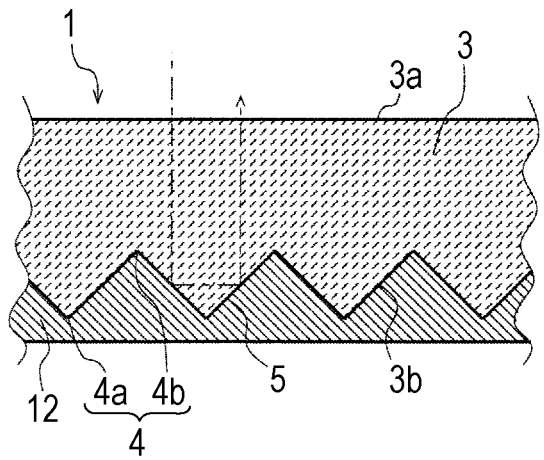
Figure 11C:
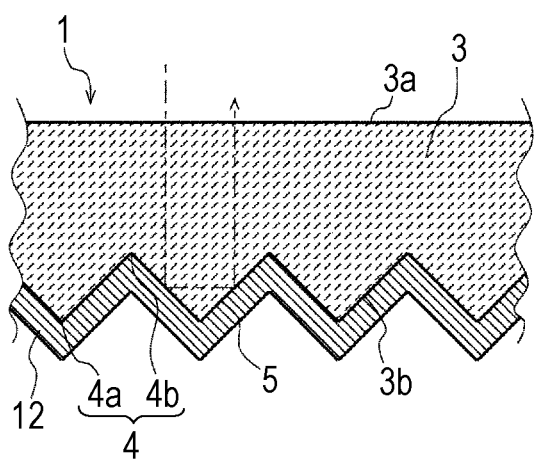

FIGS. 11A to 11C shows a variant 6 of the present invention. According to the decorative plastic molded article 1 of the variant 6, a protective portion 12 for covering the small concave and convex portion 4 of the second surface 3b of the molded article body 3 is provided. FIG. 11A gives the example showing the protective portion 12 is a plate, FIG. 11B gives the example showing the protective portion 12 is a filler, and FIG. 11C gives the example showing the protective portion 12 is a thin film. Regarding the material of the protective portion 12, in addition to the transparent plastics, non-transparent plastics or the other materials (metal, etc.) than plastics can also be considered. In addition, regarding the types shown in FIGS. 11B and 11C, it is necessary to set the reflectivity N2 of the protective portion 12 to be lower than the reflectivity N1 of the molded article body 3 to ensure the total reflection at the inclined surfaces 5.

According to the decorative plastic molded article 1 of the variant 6, the small concave and convex portion 4 can prevent itself from being damaged or the small concave and convex portion 4 (valley 4b) from being blocked by dusts via the protective portion 12 for the reason that the small concave and convex portion 4 is covered by the protective portion 12. Therefore, it is not affected by the operating environment or operating condition and the total reflection at the small concave and convex portion 4 can be ensured and the durability can be improved. In addition, corresponding to the light transmittance of the molded article body 3, the protective portion 12 can only be slightly perspectively observed from the outer portion, thus the aesthetic scope can be expanded.

In addition, when the molded article body 3 is used as a cap for the cosmetic container, the internal thread portion 15 of the side plate 7 of the molded article body 3 shown in FIGS. 1A to 1C, and 2A to 2C can also be omitted, the small concave and convex portion 4 is formed on the second surface 3b of the side plate 7 instead, the protective portion 12 (see FIGS. 11A to 11C) is provided and the same is made to cover the small concave and convex portion 4 and the internal thread portion is formed in the protective portion 12. At the moment, the internal thread portion of the protective portion 12 is threadably connected with the outer thread portion of the opening portion of the cosmetic container.

(Variant 7)

Figure 12:
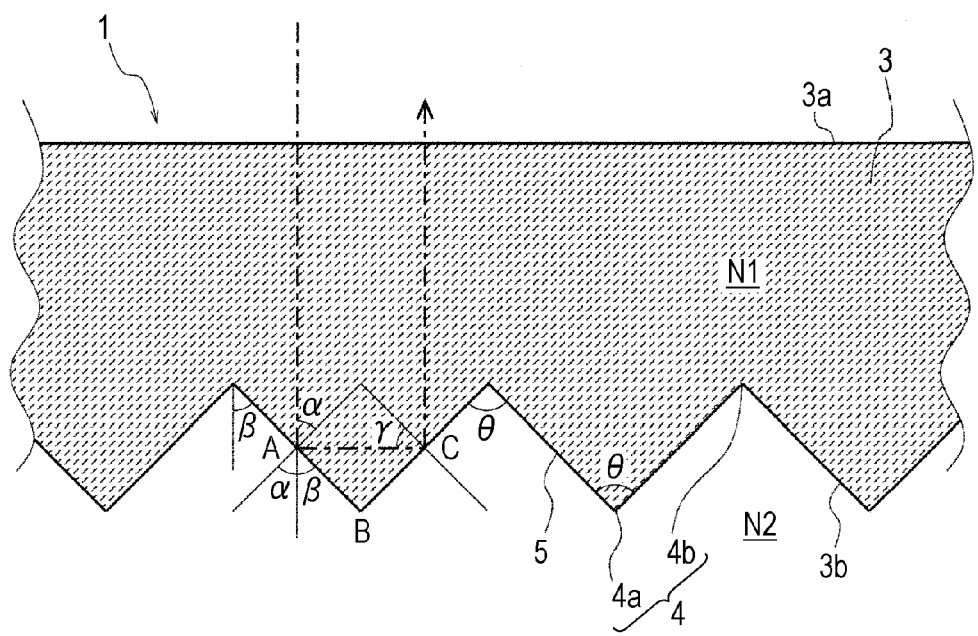
FIG. 12 is a sectional view illustrating parameters of the total reflection in the peaks and valleys of the small concave and convex portion (variant 7).

The conditions for the total reflection in the peaks 4a and the valleys 4b of the small concave and convex portion 4 are considered with FIG. 12. The conditions for the total reflection are dependent on the angle θ of the peaks 4a and the valleys 4b, reflectivity N1 of the molded article body 3, and the reflectivity N2 outside the inclined surfaces 5. The shape of the peaks 4a and the valleys 4b is provided as a triangle, and the angle thereof is provided as θ. In addition, the angle of incidence of light in the first reflection is provided as α, and the same in the second reflection is provided as γ, wherein β=θ/2.

The total reflection conditions under the first reflection are as follows.

Total reflection equation (α: the critical angle)

$$\alpha \geq \arcsin(N2/N1)(\text{rad}) \qquad (1)$$

wherein $$\beta = 90° - \alpha(\text{degrees}) = (\pi/2) - \alpha(\text{rad})$$

moreover $$\theta = 2\beta \qquad (2)$$

$$= 2(90° - \alpha)(\text{degrees}) = 2((\pi/2) - \alpha)(\text{rad}) \qquad (3)$$

equation (1) is substituted into equation (3), then $$\theta \leq 2((\pi/2) - \arcsin(N2/N1)(\text{rad}) \qquad (4)$$

The total reflection conditions wider the second reflection are as follows.

Total reflection equation (γ: the critical angle)

$$\gamma \geq \arcsin(N2/N1)(\text{rad}) \qquad (5)$$

wherein angle $CAB=\beta$ (according to an angle of incidence equals to an angle of reflection in the first reflection of dot A)

angle $ABC=\theta=2\beta$ so angle $BCA=\pi-3\beta$ (3β is subtracted from the interior angle sum π of the triangle ABC) (6)

moreover $$\gamma=(\pi/2)-\text{angle } BCA$$

which is substituted into equation (6), then $$\gamma=(\pi/2)-(\pi-3\beta) \qquad (7)$$

equation (7) is substituted into equation (5), then $$(\pi/2)-(\pi-3\beta)\geq\arcsin(N2/N1)$$

$$\beta\geq(\frac{1}{3})((\pi/2)+\arcsin(N2/N1))$$

according to equation (2)

$$\theta\geq(\frac{2}{3})((\pi/2)+\arcsin(N2/N1))(\text{rad}) \qquad (8)$$

According to equation (4) and equation (8), the conditions for the first reflection acted as the total reflection and the second reflection acted as the total reflection are $$(\frac{2}{3})((\pi/2)+\arcsin(N2/N1))\leq\theta\leq 2((\pi/2)-\arcsin(N2/N1) \qquad (9)$$

in equation (9), for example, N1=1.5, N2=1.0, then the scope of the angle θ where the first reflection is acted as the total reflection and the second reflection is acted as the total reflection is as follows.

1.533682655 (rad)≤θ≤1.682137342 (rad)

87.9 (degrees)≤θ≤96.4 (degrees)

thus the total reflection can be ensured when viewed facing to the first surface 3a from outside the molded article body 3 by setting the angle θ of the peaks 4a and the valleys 4b of the small concave and convex portion 4 with the abovementioned scope.

Based on the abovementioned consideration, in the decorative plastic molded article 1 according to the variant 7, the small concave and convex portion 4 is formed by arranging peak-shaped triangular peaks 4a and slot-shaped triangular valleys 4b in parallel; the refractive index N1 of the molded article body 1, the refractive index N2 of the medium outside the small concave and convex portion 4, and the angle θ between the peaks 4a and the valleys 4b are set to meet the following formula.

$$(\tfrac{2}{3})((\pi/2)+\arcsin(N2/N1)) \le \theta \le 2((\pi/2)-\arcsin(N2/N1)).$$

By setting the range of angle θ in such a way, when viewed facing to the first surface 3a outside the molded article body 1, the total reflection at first reflection and at second reflection of the inclined surfaces 5 of the small concave and convex portion 4 can both be ensured, therefore, the metallic color appearance can be ensured. Additionally, the angle θ (θ1, and θ2) of the peaks 4a and the valleys 4b of the small concave and convex portion 4 shown in FIG. 9 may also be selected from the range shown in equation (9).

(Variant 8)

Figure 13A:
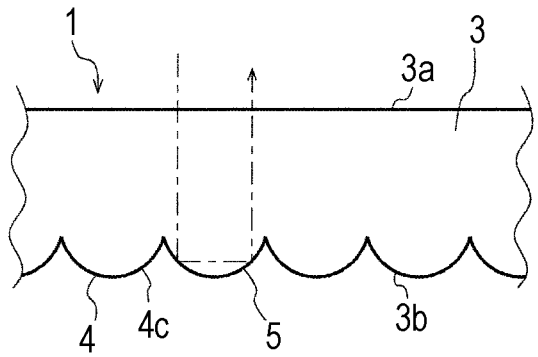
Figure 13B:
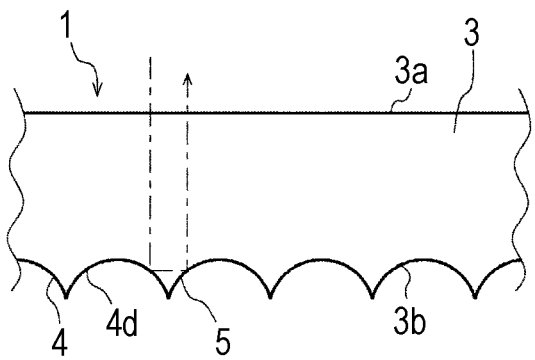
Figure 13C:
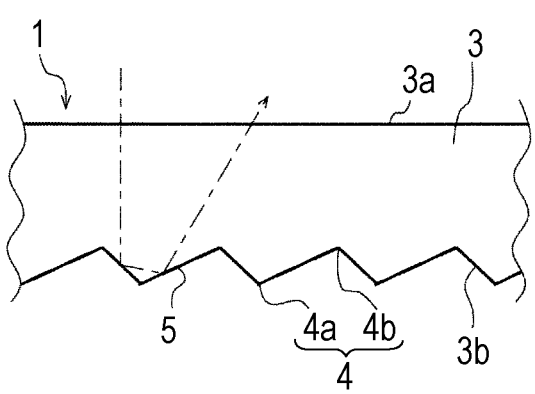

Variant 8 of the present invention is shown in FIGS. 13A to 13C. In the decorative plastic molded article 1 according to variant 8, the shape of small concave and convex portion 4 is not the shape that appears repeatedly in the triangular peaks 4a and valleys 4b as described so far, hut set to be different shapes. FIG. 13A shows an example in which the small concave and convex portion 4 is set to be a shape that is connected by convex arcs 4c, FIG. 13B shows an example in which the small concave and convex portion 4 is set to be a shape that is connected by concave arcs 4d, and FIG. 13C shows an example in which the peaks 4a and valleys 4b of the small concave and convex portion 4 is set to be bilaterally asymmetric.

Even molding the small concave and convex portion 4 according to FIG. 13A to FIG. 13C, the light entering from outside into the molded article body 3 is also reflected twice at the inclined surfaces 5 to the first surface 3a. Therefore, by setting the refractive index of the molded article body 3 to be higher than that of the medium outside the small concave and convex portion 4, the total reflection at the inclined surfaces 5 can be ensured, and when viewed facing to the first surface 3a from outside the molded article body 3, the metallic color appearance is observed. In addition, even the incident light is not parallel with the reflected light, the metallic color appearance can also be obtained.

(Other Embodiments)

Figure 14A:
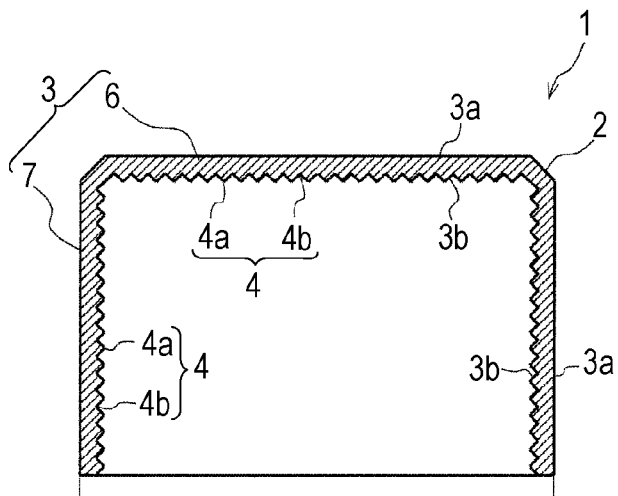

FIGS. 14A to 22C2 show other embodiments of the present invention. These embodiments are all cosmetic container cap 2. However, the present invention is not limited to cosmetic container cap 2. The basic structure, function and effect of the embodiments described below are basically the same as the embodiments described previously.

Figure 14B:
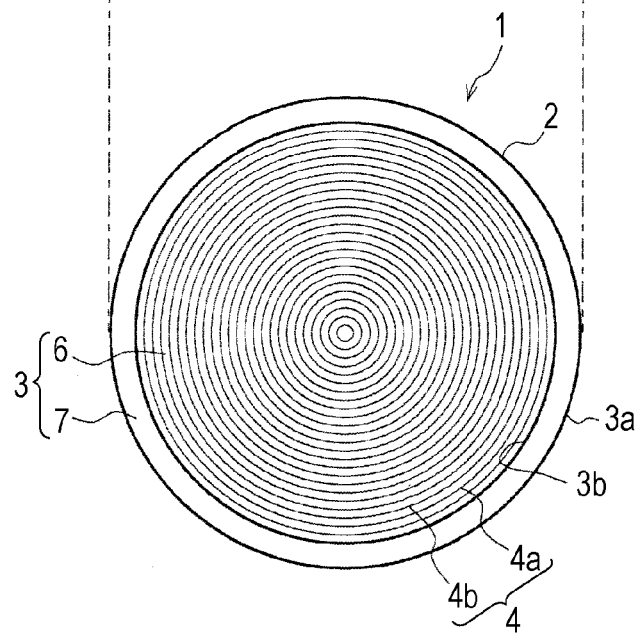

FIGS. 14A and 14B show cosmetic container cap 2 used as decorative plastic molded article 1, a top plate 6 of the molded article body 3 is a planar circular plate, and a cylindrical side plate 7 is formed integrally on the top plate at a right-angle. Below the top plate 6, concentric circle-shaped small concave and convex portion 4 are formed, and at the second surface of the side plate 7, the small concave and convex portion 4 are formed annularly in circumferential direction. These small concave and convex portion 4 have a shape that triangle peaks 4a and valleys 4b appear repeatedly.

Figure 15A:
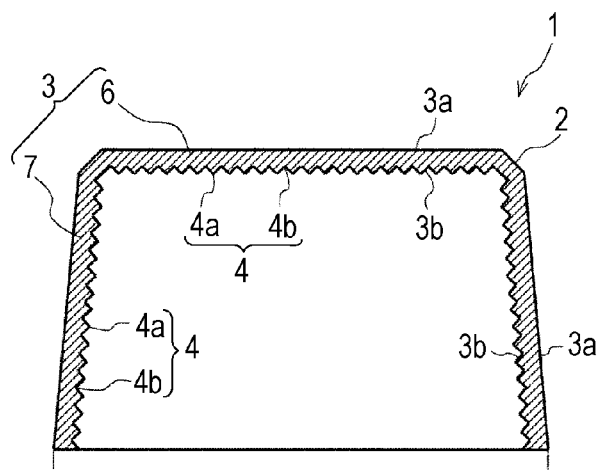
Figure 15B:
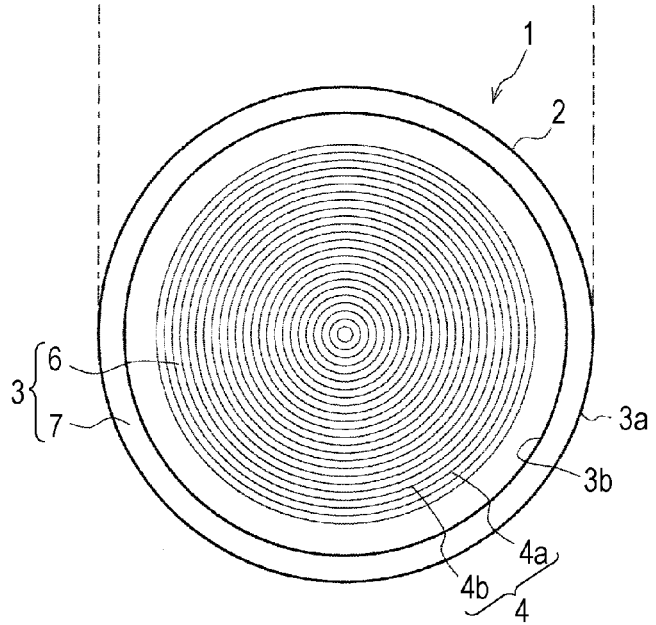

The cosmetic container cap 2 used as the decorative plastic molded article 1 shown in FIGS. 15A and 15B are basically the same as that shown in FIGS. 14A and 14B, only one point is different, that is, the cover shape at the side plate 7 is circular table (frustoconical column). According to this structure, during injection molding, the liftability while drawing the mold from inner side of side plate 7 along axial direction is improved than the type described in FIGS. 14A and 14B, and productivity is improved.

Figure 16A:
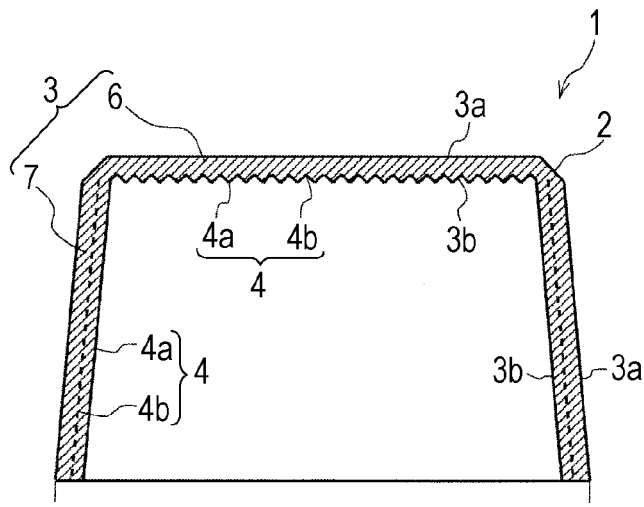
Figure 16B:
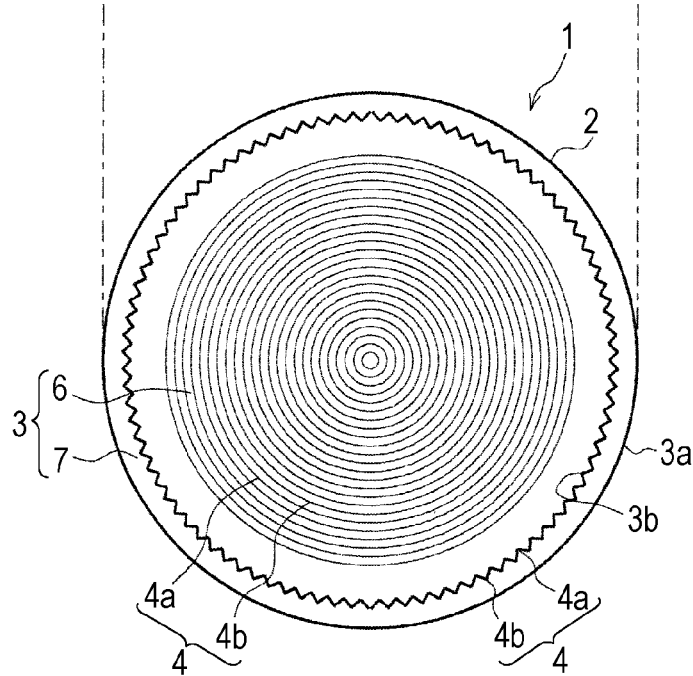

The cap 2 shown in FIGS. 16A and 16B used for cosmetic container of the decorative plastic molded article 1, is the same as that shown in FIGS. 15A and 15B, only one point that peaks 4a and valleys 4b of the small concave and convex portion 4 molded in the second surface of side plate 7 form a straight line along axial direction is different. According to this structure, during injection molding, the liftability while drawing the mold from inner side of side plate 7 along axial direction is much more improved than the type described in FIGS. 15A and 15B, and productivity is improved.

Figure 17A:
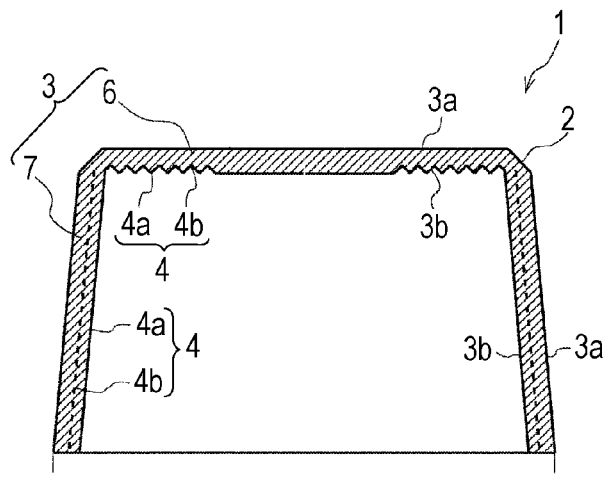
Figure 17B:
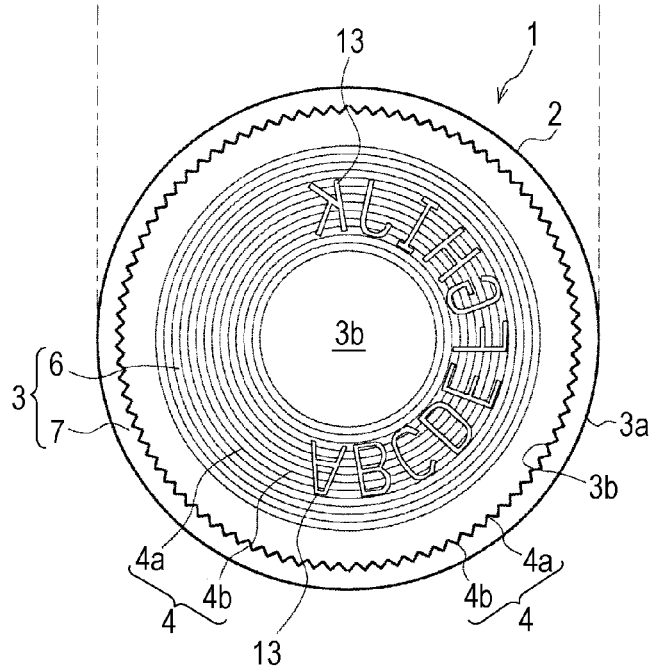

Cover 2 shown in FIGS. 17A and 17B used for cosmetic container of the decorative plastic molded article 1, is the same as that shown in FIGS. 16A and 16B, only one point that the small concave and convex portion 4 located in the top plate 6 displays a character, etc. is different. Particularly, the shape of planar transparent part 13 arranged in the small concave and convex portion 4 of top plate 6 is a character, a graph or a symbol, etc., which can be emerged and displayed by means of transparent portion 4 by total reflection of the small concave and convex portion 4 around the transparent portion 13.

The transparent part 13 is not limited to alphabets, but can be other characters such as hiragana, katakana and Chinese characters, and can also be graph, symbol, pattern, logo and trademarks, etc. The same structures may also be provided at side plate 7. Furthermore, in contrast to FIGS. 17A and 17B, the shape of small concave and convex portion 4 arranged in the planar transparent part is set as a character, a graph or a symbol etc., which can be emerged and displayed in metallic color by total reflection of the small concave and convex portion 4. In addition, the planar transparent part is not limited to colorless transparent but can be colored transparent.

Figure 18A:
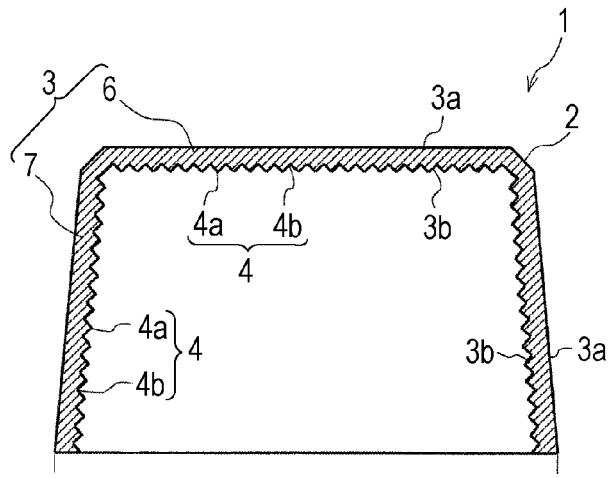
Figure 18B:
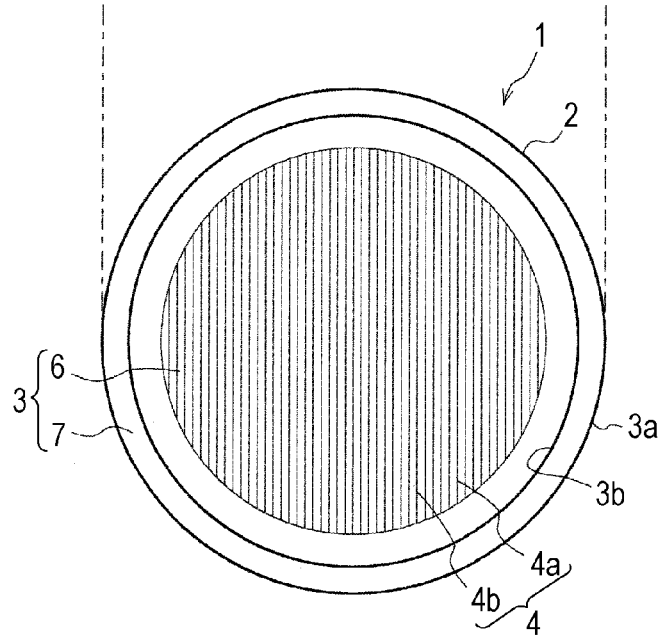

The cap 2 shown in FIGS. 18A and 18B used for cosmetic container of the decorative plastic molded article 1, is the same as that shown in FIGS. 15A and 15B, only one point that peaks 4a and valleys 4b of the small concave and convex portion 4 mold in parallel not in concentric circles is different. According to the structure, it is easy to observe inside perspectively along the peaks 4a and valleys 4b direction, and it is easy to observe metallic color like along the peaks 4a and valleys 4b orthogonal direction. Hence, visible pattern will change according to direction, which increases the interest and extends aesthetic range.

Figure 19A:
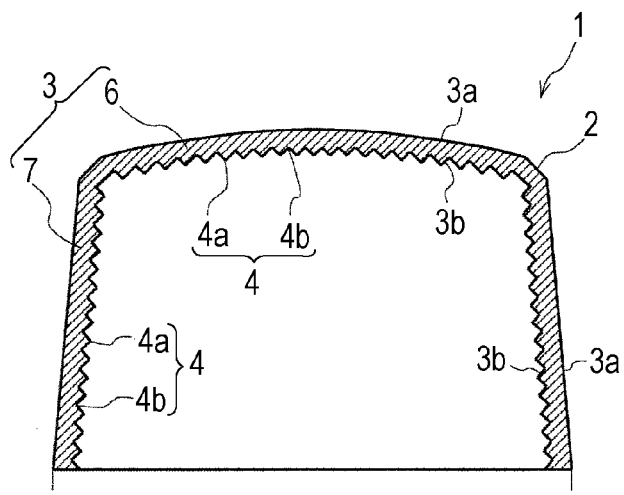
Figure 19B:
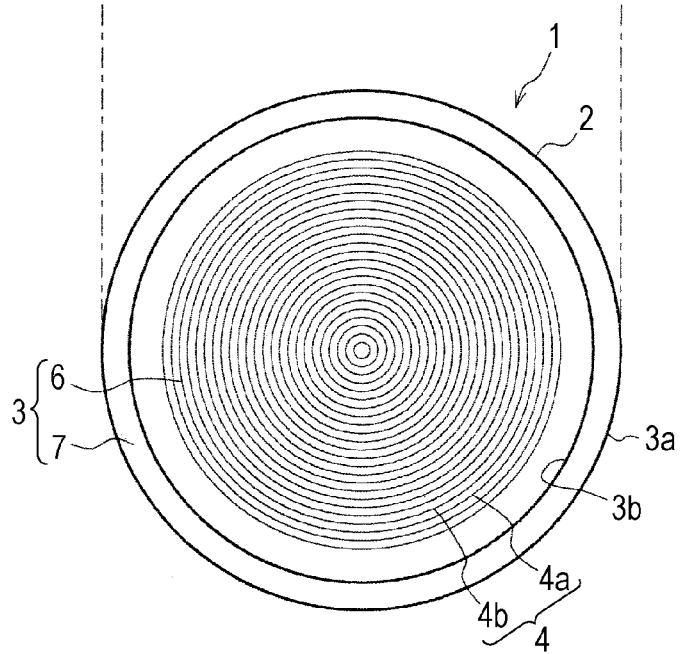

The cap 2 shown in FIGS. 19A and 19B used for cosmetic container of the decorative plastic molded article 1, is the same as that shown in FIGS. 15A and 15B, only one point that the cover shape in the top plate 6 is curved face is different. According to the structure, owning to the small concave and convex portion 4 in the second surface of top plate 6 molded from curved face, incident angle of visual line will be different due to partial difference of the small concave and convex portion 4 during observation of the small concave and convex portion 4 through molded article body 3 from the first surface 3a, the total reflection degree (metallic colors brilliant degree) will change according to partial difference, which can extends aesthetic range.

Figure 20A:
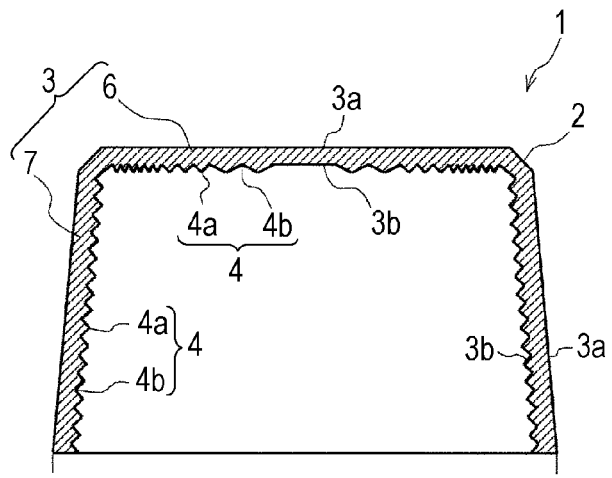
Figure 20B:
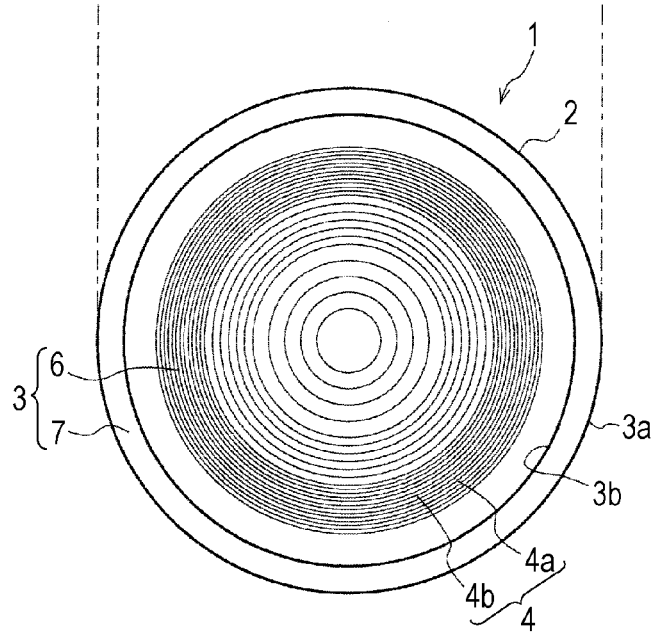

The cosmetic container cap 2 used as the decorative plastic molded article 1 shown in FIGS. 20A and 20B are substantially the same as that shown in FIGS. 15A and 15B except that the angle (i.e. V-slot angle) between the peaks 4a and valleys 4b of the small concave and convex portion 4 in the top plate 6 varies from one portion to another. In addition, although the intervals between the peaks 4a and the valleys 4b are different, the height of the peaks 4a and the depths of the valleys 4b are the same. According to this structure, as the angle between the peaks 4a and valleys 4b in the second surface 3b of the top plate 6 varies from one portion to another, brightness degree of metallic color varies from one portion of the top plate 6 to another when the top plate 6 is viewed facing to the first surface 3a from outside the top plate 6, which can extend the range of beauty.

Figure 21A:
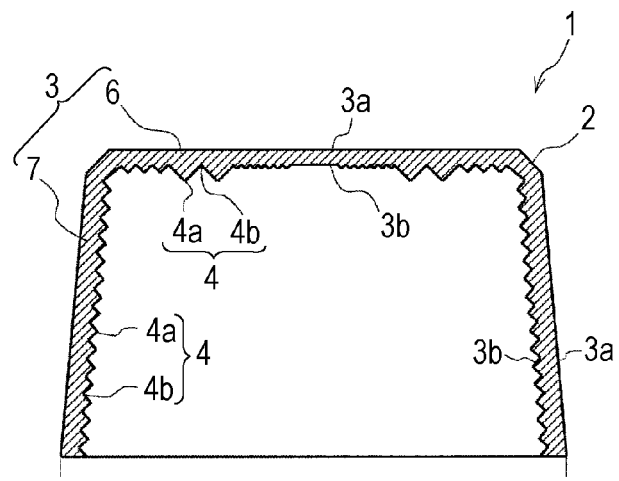
Figure 21B:
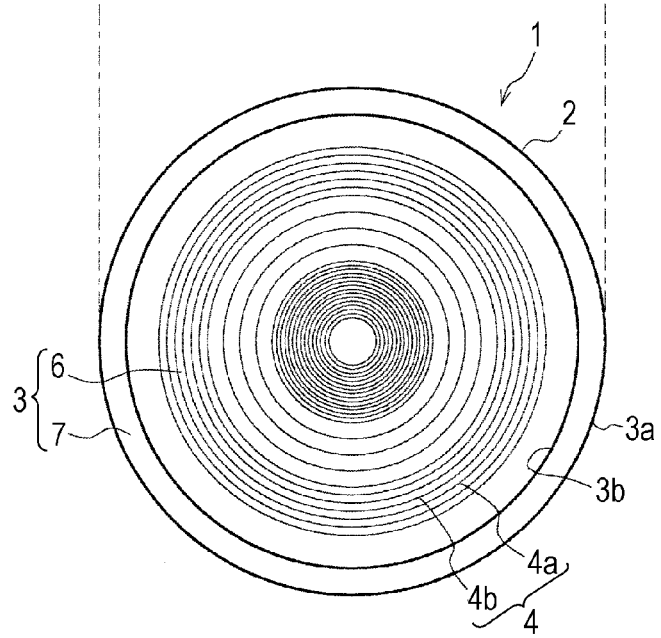

The cosmetic container cap 2 used as the decorative plastic molded article 1 shown in FIGS. 21A and 21B are substantially the same as that shown in FIGS. 15A and 15B except that the interval (i.e. V-slot width) between the peaks 4a and valleys 4b of the small concave and convex portion 4 in the top plate 6 varies from one portion to another. In addition, although the height of the peaks 4a and the depths of the valleys 4b are also different, the angles between the peaks 4a and the valleys 4b are the same. According to this structure, as the interval between the peaks 4a and valleys 4b in the second surface 3b of the top plate 6 varies from one portion to another, brightness degree of metallic color varies from one portion of the top plate 6 to another when the top plate 6 is viewed facing to the first surface 3a from outside the top plate 6, which can extend the range of beauty.

FIGS. 22A to 22C2 are a schematic diagram illustrating the shapes of the peaks 4a and the valleys 4b of the minute unevenness portion. The sectional view of the portion enveloped by circle b in FIG. 22A is shown by FIG. 22B1. As shown in FIG. 22B1, the peaks 4a and valleys 4b are formed in angles which are symmetrical on the left and right sides with respect to the base line y parallel to the bottom surface 14 of the cap 2. However, as shown in FIG. 22B2, the peaks 4a and valleys 4b are formed in angles which are symmetrical on the left and right sides with respect to the baseline z orthogonal to the first surface 3a of the side plate 7.

The manufacturability of molds used for injection molding these molded articles 1 is investigated. With respect to the mold used for the molded article 1 of FIG. 22B1, a cutting tool for cutting the peaks 4a and the valleys 4b only needs to be placed in a horizontal posture parallel to the bottom surface 14 of the cap 2, but in this regard, with respect to the mid used for the molded article 1 of FIG. 22B2, the cutting could not be conducted until the cutting tool is maintained in an inclined posture orthogonal to the side plate 7 of the cap 2. Thus, for the manufacturability of molds, the type shown in FIG. 22B1 is improved compared with the type shown in FIG. 22B2.

The sectional view of the portion enveloped by circle c in FIG. 22A is shown by FIG. 22C1. As shown in FIG. 22C1, the peaks 4a and valleys 4b are formed in angles which are symmetrical on the left and right sides with respect to the baseline w perpendicular to the bottom surface 14 of the cap 2. However, as shown in FIG. 22C2, the peaks 4a and valleys 4b also can take radius r of a curved arc of the top plate 6 as the base line and are formed in angles which are symmetrical on the left and right sides with respect to this base line.

The manufacturability of molds used for injection molding these molded articles 1 is investigated. With respect to the mold used for the molded article 1 of FIG. 22C1, a cutting tool for cutting the peaks 4a and the valleys 4b only needs to be placed in a perpendicular posture parallel to the bottom surface 14 of the cap 2, but in this regard, with respect to the mold used for the molded article 1 of FIG. 22C2, the peaks 4a and the valleys 4b could not be cut until appropriate change of the inclined angle of the cutting tool is controlled. Thus, for the manufacturability of molds, the type shown in FIG. 22C1 is improved compared with the type shown in FIG. 22C2.

FIGS. 23A to 25 further present other embodiments.

Figure 23A:
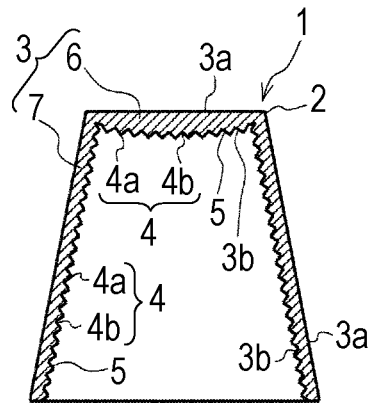
Figure 23B:
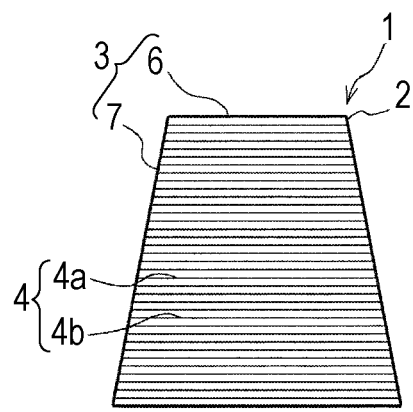
Figure 23C:
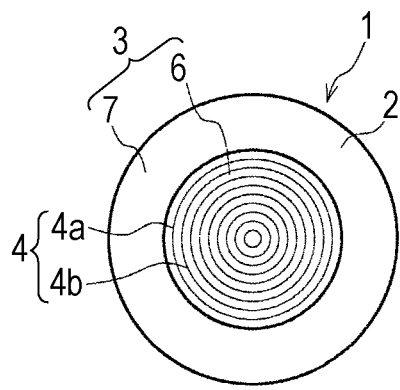

The cap 2 for the cosmetic container as the decorative plastic molded article 1 shown in FIGS. 23A to 23C are basically the same as the cover shown in FIGS. 15A to 15C, but only differs from the cover shown in FIGS. 15A to 15C in the convex arc-shaped curved surface shape of the second surface 3b of the top plate 6. In addition, for ease of understanding the shape of the small concave and convex portion 4, in FIG. 23B and FIG. 23C, it can be depicted with a solid line from the small concave and convex portion 4 on the second surface 3b which is perspective outside the molded article body 3.

Figure 24A:
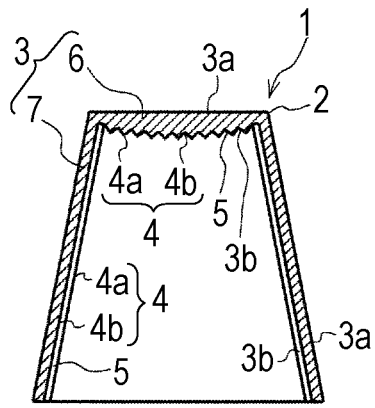
Figure 24B:
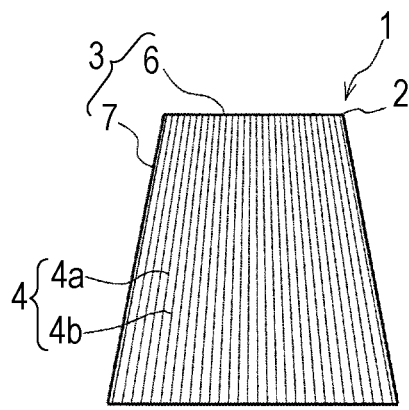
Figure 24C:
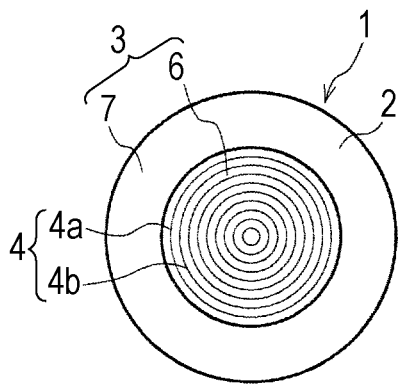

The cap 2 for the cosmetic container as the decorative plastic molded article 1 shown in FIGS. 24A to 24C are basically the same as the cover shown in FIGS. 16A and 16B, but only differs from the cover shown in FIGS. 16A and 16B in the convex arc-shaped curved surface shape of the second surface 3b of the top plate 6. In addition, for ease of understanding the shape of the small concave and convex portion 4, in FIG. 24B and FIG. 24C, it can be depicted with a solid line from the small concave and convex portion 4 on the second surface 3b which is perspective outside the molded article body 3.

According to the types shown in FIGS. 24A to 24C and FIGS. 16A and 16B, as the small concave and convex portion 4 on the side plate 7 is formed along the axial direction, during injection forming, the liftability when the mold is pulled out along the axial direction from the inner side of the side plate 7 is improved compared with the liftability of the types shown in FIGS. 23A to 23C and FIG. 25, so that the productivity is increased. In addition, in the embodiments of FIGS. 23A to 23C and FIGS. 15A and 15B, compared with the slot depth (such as about 30 μm) of the valleys 4b formed on the top plate 6, the slot depth (such as about 10-15 μm) of the valleys 4b formed on the side plate 7 is made to be relatively shallow, accordingly, it is easy to pull out the mold from the inner side of the side plate 7 during injection forming.

In addition, according to the types shown in FIGS. 23A to 23C and FIGS. 24A to 24C, as the small concave and convex portion 4 in the second surface 3b of the top plate 6 is formed on the curved surface, the angle of incidence of sight line for transmitting the molded article body 3, when viewed facing to the first surface 3a from outside the molded article body 3, will be different due to different parts of the small concave and convex portion 4, and the degree of total reflection, namely the degree of metallic color brightness changes due to different parts, no that the attractiveness range can be expanded.

Figure 25:
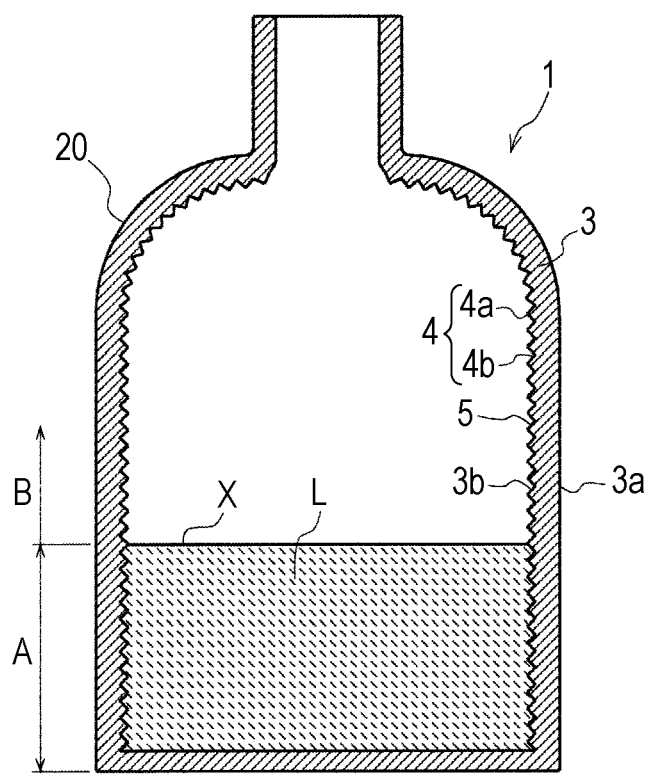
FIG. 25 shows aside sectional view illustrating a fluid container used as the decorative plastic molded article according to other embodiments of the present invention.

FIG. 25 presents the embodiment of applying the present invention to a liquid container (a cosmetic container, etc.). For the liquid container, the container body 20 is equivalent to the molded article body 3 described above. That is, the container body 20 is made of transparent plastics, and the small concave and convex portion 4 is formed on the second surface 3b thereof. The small concave and convex portion 4 has peaks 4a and valleys 4b which are annularly formed along the inner circumference direction of the container body 20.

According to the structure, when the container body 20 is in a state of storing liquid (water, toning lotion, etc.) L, the lower portion of the container body 20 below its liquid level X is transparent, while the upper portion of the container body 20 above its liquid level X has the appearance of metallic color. This is because the refractive index of the liquid L being generally higher than that of air and close to that of the material (transparent plastic) of the container body 20, thereby being difficult to cause total reflection. As a result, the appearance of the container body 20 seems to have metallic color above the liquid level X, while be transparent below the liquid level X.

Specifically, on the lower part of the container body 20 below the liquid level X, it is difficult to cause total reflection at the small concave and convex portion 4, and the inside can be perspective, so when the container body 20 is made of colorless transparent plastics, the color of the liquid L stored in the container body 20 is visual, and when the container body 20 is made of colorfully transparent plastics, the developed color becomes the developed color formed by mixing its color with the color of the liquid L. Therefore, the liquid level can be known from the appearance, the fun as the liquid container is increased, and the commodity value or attractiveness is improved.

FIGS. 26A1 to 26C2 show a variation of the small concave and convex portion 4 of the decorative plastic molded article 1 according to the present invention. FIG. 26A1 and FIG. 26A2 show an example of making the peaks 4a of the small concave and convex portion 4 to be in the shape of a rectangular pyramid, FIG. 26B1 and FIG. 26B2 show an example of making the peaks 4a of the small concave and convex portion 4 to be in the shape of a triangular pyramid, and FIG. 26C1 and FIG. 26C2 show an example of making the peaks 4a of the small concave and convex portion 4 to be in the shape of a circular cone. The variations of the small concave and convex portion 4 will be illustrated below.

As shown FIG. 26A1, multiple V-shaped slots are formed at equal intervals and in a 90-degree staggered manner in the second surface 3b of the molded article body 3 (the circular plate) of the decorative plastic molded article 1. Accordingly, as shown in FIG. 26A2, the peaks 4a of the small concave and convex portion 4 are formed by parallel arrangement of multiple rectangular pyramids, and the valleys 4b of the small concave and convex portion 4 are formed in parallel among various vertexes of the rectangular pyramids. According to such small concave and convex portion 4, when the molded article body 3 is viewed facing to the first surface 3a from outside the molded article body, due to total reflection of the incident light on each side of the rectangular pyramids, the range of the view angle of the metallic color seems to be expanded, and it seems to have metallic color when viewed from multiple directions.

As shown in FIG. 26B1, multiple V-shaped slots are formed at equal intervals and in a 120-degree staggered manner in the second surface 3b of the molded article body 3 (the circular plate) of the decorative plastic molded article 1. Accordingly, as shown in FIG. 26B2, the peaks 4a and the valleys 4b of the small concave and convex portion 4 are formed by parallel arrangement of multiple triangular pyramids. According to such small concave and convex portion 4, when the molded article body 3 is viewed facing to the first surface 3a from outside the molded article body 3, due to total reflection of the incident light on each side of the triangular pyramids, the range of the view angle of the metallic color seems to be expanded, and it seems to have metallic color when being viewed from multiple directions.

As shown in FIG. 26C1 and FIG. 26C2, multiple circular cones are arranged at equal intervals in parallel on the second surface 3b, as the peaks 4a of the small concave and convex portion 4, of the molded article body 3 (the circular plate) of the decorative plastic molded article 1. Accordingly, the peaks 4a and the valleys 4b of the small concave and convex portion 4 are formed by parallel arrangement of multiple circular cones. According to such a small concave and convex portion 4, when the molded article body 3 is viewed facing to the first surface 3a from outside the molded article body 3, due to total reflection of the incident light at the sides of the circular cones, the range of the view angle of the metallic color seems to be expanded, and it seems to have metallic color when being viewed from multiple directions.

In addition, the peaks 4a of the small concave and convex portion 4 are not limited to the above shapes of the rectangular pyramid and the triangular pyramid, and can also be in the shape of a polygonal pyramid (such as a hexagonal pyramid). When the peaks 4a are made to be in the shape of the polygonal pyramid, the peaks 4a are molded by increasing the number of the V-shaped slots corresponding to its shape, or the mold for injection molding is made to be in a shape corresponding to the shape of the polygonal pyramid for molding.

Preferred embodiments of the present invention are explained above in reference to the drawings, but obviously, the present invention is not limited by the above embodiments. It goes without saying that various changes and modifications within the scope recorded by claims fall within the scope of the present invention as well. For example, the decorative plastic molded article 1 according to the present invention is not limited to the cap 2 used for the cosmetic container 2 or the liquid container, and can be adapted for all plastic molded articles requiring metallic color appearance, such as gemstone boxes, cellphone cases, and cosmetic containers. In addition, various embodiments described by the specification and various changes may be combined as well.

The present invention is capable of utilizing the decorative plastic molded article that can give a metallic color appearance without applying painting or coating a film on the plastic molded article such a cosmetic container or a cap of the cosmetic container, and a manufacturing method thereof.

Numerous additional modifications and variations are possible in light of the above teachings. It is therefore to be understood that within the scope of the appended claims, the disclosure of this patent specification may be practiced otherwise than as specifically described herein.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

REFERENCE SIGNS

1 Decorative plastic molded article
2 Cap
3 Molded article body
3a First surface
3b Second surface
4 Small concave and convex portion
4a Peak
4b Valley
5 Inclined surface
8 Light-transmitting portion
12 Protective portion
13 Transparent portion
N1 Refractive index of the molded article body
N2 Refractive index of the medium outside the inclined surface
θ Angle between the peak and the valley
p Pitch between the peak and the valley
d Depth between the peak and the valley

What is claimed is:

1. A decorative plastic molded article having light transmittance property, comprising a molded article body, wherein,
said molded article body has a top portion and a side plate portion, wherein the top portion comprises a first planar surface and a second surface opposite the first planar surface, on the second surface there is a plurality of first concave-convex portions and a plurality of transmission portions disposed among the plurality of the first concave-convex portions, and the first concave-convex portions comprise:
a plurality of first inclined surfaces with a plurality of peaks that form a plurality of first recesses, the plurality of recesses include at least two recesses arranged in a concentric pattern, wherein
the plurality of first inclined surfaces is positioned to reflect light incident the decorative molded plastic article at the first planar surface back toward the first planar surface, wherein the reflected light provides a silverish metallic color obtained by total reflection of the incident light at the plurality of first inclined surfaces,
the plurality of transmission portions are arranged in a shape of a character, a graph or a symbol, and the plurality of transmission portions is positioned to transmit light incident the decorative molded plastic article at the first planar surface through the second surface,
the side plate portion extends in a direction perpendicular to the first planar surface of the top portion, and the side plate portion comprises:
a third surface, and
a fourth surface opposite the third surface, wherein the fourth surface comprises a plurality of second concave-convex portions having a plurality of second inclined surfaces with a plurality of peaks that form a plurality of second recesses, the plurality of second recesses is arranged in a second pattern different from the concentric pattern, and are positioned to provide a silverish metallic color appearance obtained by total reflection of incident light at the plurality of second inclined surfaces.

2. A decorative plastic molded article having light transmittance property, comprising a molded article body, wherein,
said molded article body has a top portion and a side plate portion, wherein the top portion comprises a first planar surface and a second surface opposite the first planar surface, on the second surface there is a plurality of first concave-convex portions and a plurality of transmission portions disposed among the plurality of the first concave-convex portions, and the first concave-convex portions comprise:
a plurality of first inclined surfaces with a plurality of peaks that form a plurality of first recesses, the plurality of recesses include at least two recesses arranged in a first pattern, wherein
the plurality of first inclined surfaces is positioned to reflect light incident the decorative molded plastic article at the first planar surface back toward the first planar surface, wherein the reflected light is reflected by total reflection of the incident light at the plurality of first inclined surfaces,
the plurality of transmission portions are arranged in a shape of a character, a graph or a symbol, and the plurality of transmission portions is positioned to transmit light incident the decorative molded plastic article at the first planar surface through the second surface,
the side plate portion extends in a direction perpendicular to the first planar surface of the top portion, and the side plate portion comprises:
a third surface, and
a fourth surface opposite the third surface, wherein the fourth surface comprises a plurality of second concave-convex portions having a plurality of second inclined surfaces with a plurality of peaks that form a plurality of second recesses, the plurality of second recesses is arranged in a second pattern different from the first pattern, and are positioned to reflect by total reflection of incident light at the plurality of second inclined surfaces.

3. The decorative plastic molded article according to claim 2, wherein the plurality of second concave-convex portions is formed by arranging a plurality of peaks and valleys in parallel, and at least one of the peaks or the valleys has a planar light-transmitting portion, wherein the planar light-transmitting portion enables the light entering from outside to transmit through the molded article body.

4. The decorative plastic molded article according to claim 2, wherein in at least one part of the top portion there are portions having different total areas of the light-transmitting portions per unit area.

5. The decorative plastic molded article according to claim 4, wherein the total area of the light-transmitting portions is set in a way that a total light transmittance of the top portion of the molded article body is in the range from greater than 0% to 60% when the light at a wavelength of 633 nm is incident from the first surface.

6. The decorative plastic molded article according to claim 2, wherein the plurality of second concave-convex portions is formed by arranging the plurality of peaks that form the plurality of second recesses in parallel; and the plurality of peaks that form the plurality of second recess has different angles, pitches, or depths in comparison with the plurality of peaks that form the plurality of first recesses.

7. The decorative plastic molded article according to claim 2, wherein the third surface is a curved surface.

8. The decorative plastic molded article according to claim 2, further comprising protective portions for covering the plurality of first concave-convex portions.

9. The decorative plastic molded article according to claim 2, wherein the plurality of second concave-convex portions is formed by arranging triangular peaks and triangular slot-shaped valleys in parallel; the refractive index N1 of the molded article body, the refractive index N2 of a medium outside the plurality of second inclined surfaces of the molded article body, and the angle θ between the triangular peaks and the triangular valleys meet the following equation:

$$(2/3)((\pi/2)+\arcsin(N2/N1)) \leq \theta \leq 2((\pi/2)-\arcsin(N2/N1)).$$

10. The decorative plastic molded article according to claim 2, wherein the plurality of peaks that form the second plurality of recesses is formed by arranging a plurality of polygonal pyramids or circular cones in parallel.

11. A method of manufacturing the decorative plastic molded article according to claim 2, comprising preparing a mold with shape of the molded article body, the plurality of first concave-convex portions, the plurality of second concave-convex portions, and injection molding the molded article body at one time by using the mold.

12. The decorative article of claim 2, wherein each light transmission portion of the plurality of light transmission portions is planar.

13. The decorative article of claim 12, wherein a light transmission portion of the plurality of light transmission portions is between adjacent first inclined surfaces of the plurality of first inclined surfaces.

14. The decorative article of claim 12, wherein light transmission portion is surrounded by each first inclined surface of the plurality of first inclined surfaces.

15. The decorative article of claim 12, wherein a light transmission portion of the plurality of light transmission portions is between an edge of the top portion and each first inclined surface of the plurality of first inclined surfaces.

16. The decorative article of claim 2, wherein the first pattern is a concentric pattern.

17. A decorative plastic molded article having light transmittance property, comprising a molded article body, wherein,
said molded article body has a top portion and a side plate portion, wherein the top portion comprises a first planar surface and a second surface opposite the first planar surface, on the second surface there is a plurality of first concave-convex portions and a plurality of transmission portions disposed among the plurality of the first concave-convex portions, and the first concave-convex portions comprise:
a plurality of first inclined surfaces with a plurality of peaks that form a plurality of first recesses, the plurality of recesses include at least two recesses arranged in a concentric pattern, wherein
the plurality of first inclined surfaces is positioned to reflect light incident the decorative molded plastic article at the first planar surface back toward the first planar surface, wherein the reflected light is reflected by total reflection of the incident light at the plurality of first inclined surfaces,
the plurality of transmission portions are arranged in a shape of a character, a graph or a symbol, and the plurality of transmission portions is positioned to transmit light incident the decorative molded plastic article at the first planar surface through the second surface,
the side plate portion extends in a direction perpendicular to the first planar surface of the top portion, and the side plate portion comprises:
a third surface, and
a fourth surface opposite the third surface, wherein the fourth surface comprises a plurality of second concave-convex portions having a plurality of second inclined surfaces with a plurality of peaks that form a plurality of second recesses, the plurality of second recesses is arranged in a second pattern different from the concentric pattern, and are positioned to reflect by total reflection of incident light at the plurality of second inclined surfaces.

18. The decorative article of claim 17, wherein the plurality of second concave-convex portions differ from the plurality of first concave-convex portions in at least one of depth, pitch or angle.

19. The decorative article of claim 17, wherein each second recess of the plurality of second recesses extend parallel to adjacent second recesses of the plurality of second recesses.

* * * * *